United States Patent
Wada et al.

(10) Patent No.: US 7,171,943 B1
(45) Date of Patent: Feb. 6, 2007

(54) CONTROL APPARATUS FOR AN INTERNAL COMBUSTION ENGINE

(75) Inventors: Koji Wada, Tokyo (JP); Masakazu Miyasako, Tokyo (JP); Motoyasu Suenaga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/350,784

(22) Filed: Feb. 10, 2006

(30) Foreign Application Priority Data

Sep. 7, 2005 (JP) ............................. 2005-259185

(51) Int. Cl.
*F02D 13/00* (2006.01)
*F01L 1/00* (2006.01)

(52) U.S. Cl. .................................. 123/348; 123/90.15

(58) Field of Classification Search ................ 123/348, 123/90.11, 90.15, 90.16, 90.17
See application file for complete search history.

(56) References Cited

U.S. PATENT DOCUMENTS 6,722,325 B2 * 4/2004 Shimizu et al. .......... 123/90.15

FOREIGN PATENT DOCUMENTS

JP 06-317129 B2 11/1994
JP 2003-83116 * 3/2003

* cited by examiner

*Primary Examiner*—Hai Huynh
(74) *Attorney, Agent, or Firm*—Sughrue Mion, PLLC

(57) ABSTRACT

A control apparatus for an internal combustion engine can avoid an increase in harmful components in an exhaust gas even if a variable valve timing mechanism is controlled to be driven at the time of executing the correction of basic timing. The apparatus includes a variable valve timing mechanism for adjusting the opening and closing timing of an intake valve, a variable valve timing control device for driving and controlling the variable valve timing mechanism based on an operating state of an internal combustion engine, a rotation speed detection part for detecting an engine rotational speed, and an intake negative pressure detection part for detecting an intake negative pressure in an intake pipe. The variable valve timing control device includes a basic timing correction permission part, a target intake negative pressure setting part, an intake air amount adjustment part, a correction time driving control part, and a basic timing correction part.

4 Claims, 16 Drawing Sheets

AMOUNT OF CORRECTION KPb (Ne, $\theta$)

| | | $\theta$ [deg] | | | | |
|---|---|---|---|---|---|---|
| | | 0 | 5 | 10 | 15 | ... | 33 |
| Ne [r/min] | 1000 | 0 | 0 | 0 | 0 | ... | 0 |
| | 1500 | 5 | 5 | 5 | 8 | ... | 17 |
| | ... | ... | ... | ... | ... | ... | ... |
| | 3000 | 15 | 15 | 15 | 17 | ... | 23 |
| | ... | ... | ... | ... | ... | ... | ... |
| | 7000 | 20 | 20 | 20 | 22 | ... | 28 |

| ARRANGEMENT No. | tRVmem | KPbmem | θmem |
|---|---|---|---|
| 0 | 150 | 30 | 0 |
| 1 | 151 | 29 | 0 |
| 2 | 152 | 28 | 1 |
| 3 | 154 | 27 | 2 |
| ... | ... | ... | ... |
| Nmax | 280 | 15 | 25 |

CONTROL APPARATUS FOR AN INTERNAL COMBUSTION ENGINE

BACKGROUND OF THE INVENTION

1. Field of the Invention

The present invention relates to a control apparatus for an internal combustion engine provided with a variable valve timing mechanism and a variable valve timing control device which serve to continuously adjust the opening and closing timing of an intake valve in accordance with an operating state of the internal combustion engine.

2. Description of the Related Art

In general, as a control apparatus for an internal combustion engine including a variable valve timing control device for adjusting the opening and closing timing of an intake valve of an internal combustion engine, there has been proposed one that corrects basic timing based on a mechanically engaged position of a variable valve timing mechanism (see, for instance, a first patent document: Japanese patent No. 3395240).

In addition, as a device for correcting basic timing by directly detecting the opening and closing timing of an intake valve, there has been known one which includes a variable valve timing mechanism that adjusts the opening and closing of an intake valve based on basic timing, an operating state detection part that detects the operating state of an internal combustion engine, a driving control part for driving and controlling the variable valve timing mechanism, an intake negative pressure detection part that detects an intake negative pressure (depression at an engine manifold) of the internal combustion engine, a negative pressure difference storage part that stores a basic negative pressure difference before and after timing adjustment, a correction time driving control part for driving and controlling at the time of correction, and a basic timing correction part (see, for instance, a second patent document: Japanese patent No. 3161152).

In the variable valve timing control device described in the above-mentioned second patent document, the intake valve is driven, in synchronization with the rotation of the internal combustion engine at timing with a predetermined phase difference, to open and close an intake pipe leading to a combustion chamber of the internal combustion engine.

The variable valve timing mechanism is constructed in such a manner as to be able to adjust the opening and closing timing of the intake valve, so that the opening and closing timing of the intake valve is continuously adjusted to an advance angle side and a retard angle side with reference to a predetermined basic timing.

The driving control part drives and controls the variable valve timing mechanism on the basis of the detection result of the operating state detection part.

The intake negative pressure detection part detects the intake negative pressure (i.e., negative pressure in the intake pipe) that varies in accordance with the adjustment of the opening and closing timing of the intake valve.

The negative pressure difference storage part stores a basic negative pressure difference between a first intake negative pressure at the time when the variable valve timing mechanism becomes a predetermined basic state in which the intake valve is opened and closed at the basic timing, and a second intake negative pressure at the time when the variable valve timing mechanism is controlled to be driven to open the intake valve so as to advance the opening and closing timing thereof a predetermined amount from the basic timing.

The correction time driving control part once nullifies the driving control of the variable valve timing mechanism by the driving control part when the operating state of the internal combustion engine (based on the detection result of the operating state detection part) is in a prescribed and predetermined state, and sets the variable valve timing mechanism to a predetermined state in which the intake negative pressure in the intake pipe becomes the first intake negative pressure, after which the variable valve timing mechanism is controlled to be driven to advance the opening and closing timing of the intake valve.

When an actually measured negative pressure difference between an intake negative pressure measured based on the detection result of the intake negative pressure detection part when the operating state of the internal combustion engine is in the predetermined state and an intake negative pressure measured at the start of the driving control of the correction time driving control part exceeds the basic negative pressure difference stored beforehand in the negative pressure difference storage part, the basic timing correction part corrects the basic timing based on the state of the variable valve timing mechanism at that time.

The conventional apparatus described in the above-mentioned second patent document is advantageous in that it corrects the basic timing by directly detecting the opening and closing timing of the intake valve, so it can perform correction with a higher degree of precision than the conventional apparatus described in the first patent document can do in which the basic timing is corrected at the mechanically engaged position of the variable valve timing mechanism.

Although in the variable valve timing control device described in the above-mentioned second patent document, the valve timing mechanism is controlled to be driven so as to detect the second intake negative pressure after the intake negative pressure in the intake pipe is set to a predetermined state, i.e., the first intake negative pressure, the intake negative pressure changes when the operating state (for instance, rotational speed) of the internal combustion engine changes even if the valve timing is constant.

Accordingly, if the engine operating state changes from the time when the intake negative pressure in the intake pipe is set to the predetermined state (the first intake negative pressure) until the detection of the second intake negative pressure, the relation between the valve timing and the intake negative pressure can not be correctly acquired.

Thus, in the device described in the above-mentioned second patent document, in order to correctly acquire the relation between the opening and closing timing of the intake valve and the intake negative pressure, an idling operation, for example, is set as an operating condition in which the engine operating state can be assumed to be unchangeable over a fixed period of time, and the valve timing is corrected in the idling state of the engine.

As described in the second patent document, the variable valve timing control device in the conventional internal combustion engine control apparatus corrects the valve timing in an operating condition (idling state), in which the engine operating state does not change over a fixed period of time, so as to correctly obtain the relation between the valve timing and the intake negative pressure, so there is a problem that it is impossible to perform correction at times other than during idling operation.

In addition, during idling, the flow rate or speed of air sucked into the internal combustion engine becomes slow, so there is another problem that when the valve timing is changed to an advance angle side in the idling state of the engine, the scavenge performance of the exhaust gas of the internal combustion engine is reduced to generate defective combustion, thus resulting in an increase of harmful components in the exhaust gas.

Further, in the conventional apparatus described in the above-mentioned second patent document, the degree of opening of an idle speed control valve is fixed at the time of execution of a correction operation, so when a rough idle state is generated due to the defective combustion resulting from the operation of the variable valve timing mechanism, the rotational speed of the internal combustion engine can not be maintained at a predetermined target idle rotational speed.

Accordingly, there arise the following problems. That is, the intake negative pressure varies according to abnormal rotational fluctuations, so there is a consequent possibility of causing engine stall, as a result of which it becomes impossible to correctly acquire the relation between the opening and closing timing of the intake valve and the intake negative pressure, so the basic timing of the variable valve timing mechanism is not able to be corrected with a high degree of precision.

SUMMARY OF THE INVENTION

The present invention is intended to solve the problems as referred to above, and has for its object to obtain a control apparatus for an internal combustion engine which can avoid an increase in harmful components in an exhaust gas even if a variable valve timing mechanism is driven and controlled at the time of executing the correction of basic timing.

Another object of the present invention is to obtain a control apparatus for an internal combustion engine which can prevent the occurrence of a rough idle state and engine stall thereby to acquire a relation between the opening and closing timing of an intake valve and an intake negative pressure in an accurate manner, thus making it possible to correct basic timing with a high degree of precision.

Bearing the above objects in mind, according to the present invention, there is provided a control apparatus for an internal combustion engine which includes: an intake valve that is driven in synchronization with the rotation of an internal combustion engine at timing with a predetermined phase difference thereby to open and close an intake pipe leading to a combustion chamber of the internal combustion engine; a variable valve timing mechanism that continuously adjusts the opening and closing timing of the intake valve to an advance angle side and a retard angle side with reference to a predetermined basic timing; a variable valve timing control device that includes an operating state detection part for detecting an operating state of the internal combustion engine, and serves to drive and control the variable valve timing mechanism based on the engine operating state; a rotational speed detection part that detects a rotational speed of the internal combustion engine; and an intake negative pressure detection part that detects an intake negative pressure in the intake pipe varying in accordance with an adjustment of the opening and closing timing of the intake valve. The variable valve timing control device includes: a basic timing correction permission part that permits a correction operation for the basic timing when the operating state of the internal combustion engine is in a fuel cut-off state; a target intake negative pressure setting part that determines, based on the rotational speed of the internal combustion engine, a target intake negative pressure that should be set as an initial state of the correction operation for the basic timing when the correction operation for the basic timing is permitted; an intake air amount adjustment part that adjusts an amount of intake air sucked into the combustion chamber so as to make the intake negative pressure detected by the intake negative pressure detection part coincide with the target intake negative pressure; a correction time driving control part that controls the variable valve timing mechanism so as to be driven to advance after the intake negative pressure is made to coincide with the target intake negative pressure by means of the intake air amount adjustment part; and a basic timing correction part that corrects the basic timing based on the state of the variable valve timing mechanism when an intake negative pressure change index calculated by using the intake negative pressure exceeds a predetermined value during the driving and controlling operation of the correction time driving control part.

According to the present invention, upon detection of the intake negative pressure, the variable valve timing mechanism is controlled to be driven during a fuel cut-off operation which does not contribute to the combustion of the internal combustion engine, so no defective combustion is generated, thus making it possible to suppress an increase of harmful components in an exhaust gas.

In addition, since the correction of basic timing is not effected by using a mechanically engaged position, it is possible to correct the basic timing of the variable valve timing mechanism with a high degree of precision without depending on mechanical errors of component parts, etc.

Moreover, since defective combustion is not generated, it is possible to prevent the variation of the intake negative pressure and engine stall due to a rough idle state, and hence the basic timing of the variable valve timing mechanism can be corrected in a highly precise manner.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1

Figure 1:
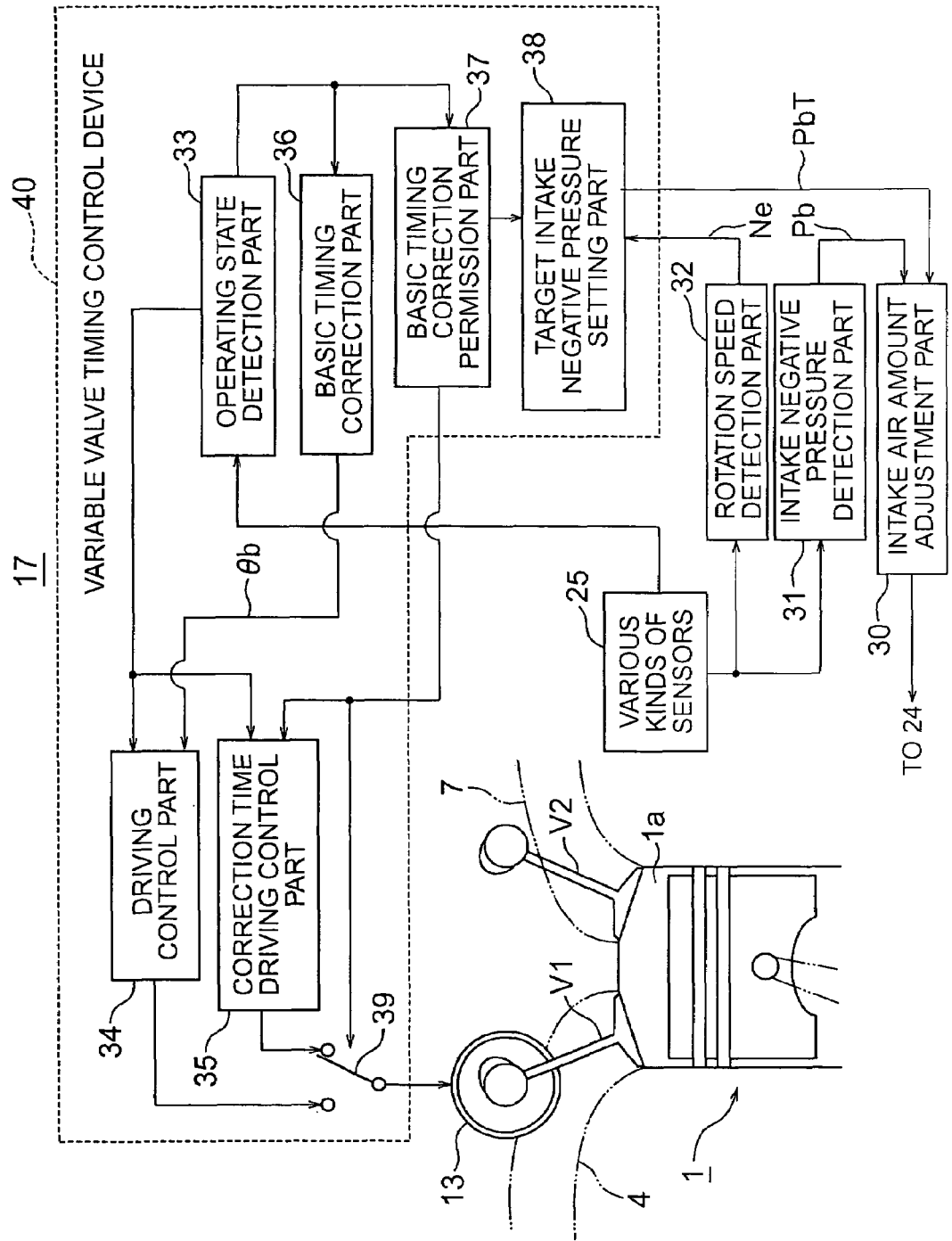
FIG. 1 is a block diagram conceptually showing the basic functional configuration of a control apparatus for an internal combustion engine according to a first embodiment of the present invention.

FIG. 1 is a block diagram that conceptually shows the basic functional configuration of a control apparatus for an internal combustion engine according to a first embodiment of the present invention, in which there are illustrated individual parts 30 through 39 in an ECU (electronic control unit), generally designated at reference numeral 17, which together constitute the control apparatus for an internal combustion engine. Also, the individual parts 33 through 39 in the ECU 17 together constitute a variable valve timing control device, generally designated at reference numeral 40.

Figure 2:
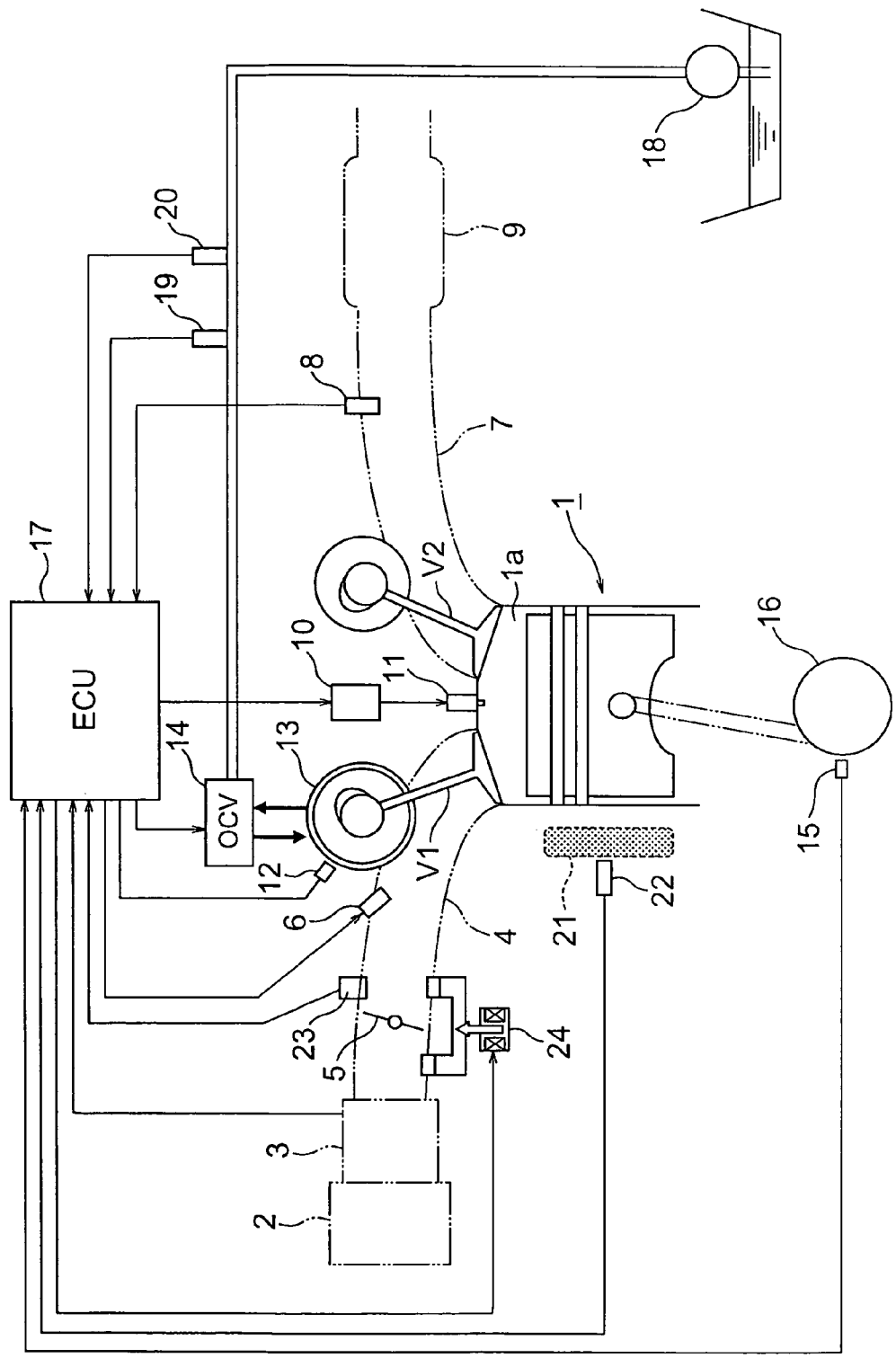
FIG. 2 is a configuration view schematically showing a surrounding structure of the internal combustion engine to which the first embodiment of the present invention is applied.

FIG. 2 is a configuration view that schematically shows a surrounding structure of the internal combustion engine to which the first embodiment of the present invention is applied.

In the respective figures, the same reference numerals and characters are attached to similar component elements.

In FIG. 1, connected with a combustion chamber 1a of an internal combustion engine, generally designated at reference numeral 1, are an intake pipe 4 for supplying a mixture of intake air and injected fuel to the combustion chamber 1a, and an exhaust pipe 7 for exhausting an exhaust gas generated after combustion of the mixture in the combustion chamber 1a.

An intake valve V1 and an exhaust valve V2 for opening and closing the intake pipe 4 and the exhaust pipe 7, respectively, are arranged at connecting portions of the combustion chamber 1a with the intake pipe 4 and the exhaust pipe 7, respectively.

A cam phase actuator (variable valve timing mechanism) 13 is mounted on the intake valve V1 for changing the relative angle (cam phase) of a camshaft (not shown) with respect to a crankshaft (not shown).

The intake valve V1 is driven to open and close in synchronization with the rotation of the crankshaft, at timing with a predetermined phase difference, which is driven by the internal combustion engine 1, whereby the intake pipe 4 leading to the combustion chamber 1a is opened and closed.

The opening and closing timing of the intake valve V1 is continuously adjusted to an advance angle side and a retard angle side based on predetermined basic timing $\theta b$ by a variable valve timing mechanism 13.

Various kinds of sensors 25 (specifically, see FIG. 2) for collecting information related to the operating state of the internal combustion engine are arranged or mounted on the internal combustion engine 1 and its surrounding elements, and detected pieces of information of the various kinds of sensors 25 are input to the ECU 17.

The ECU 17 includes an intake air amount adjustment part 30, an intake negative pressure detection part 31 for detecting an intake negative pressure Pb from output voltages of various kinds of sensors 25, and a rotation speed detection part 32 for detecting the rotational speed Ne of the engine 1 from the output voltages of various kinds of sensors 25.

Also, the ECU 17 further includes, as the variable valve timing control device 40, an operating state detection part 33 for detecting various pieces of operating state information (including an intake negative pressure Pb, etc.) from the output voltages of the various kinds of sensors 25, a driving control part 34 for driving and controlling the variable valve timing mechanism 13, a correction time driving control part 35, a basic timing correction part 36, a basic timing correction permission part 37, a target intake negative pressure setting part 38, and a control switching part 39.

The intake air amount adjustment part 30 functions as a control section for the internal combustion engine 1, and serves to control an idle speed control valve 24 (to be described later) thereby to adjust the amount of intake air sucked into the internal combustion engine 1.

The intake negative pressure detection part 31 detects the intake negative pressure Pb that varies in accordance with the adjustment of the opening and closing timing of the intake valve V1.

The driving control part 34, constituting the major part of the variable valve timing control device 40, drives and controls the variable valve timing mechanism 13 based on the operating state of the internal combustion engine 1 detected by the operating state detection part 33.

The various pieces of operating state information detected by the operating state detection part 33 are input to the driving control part 34, the correction time driving control part 35, the basic timing correction part 36, and the basic timing correction permission part 37.

The basic timing correction part 36 corrects the basic timing $\theta b$ based on the engine operating state, as will be described later. The driving control part 34 controls the variable valve timing mechanism 13 in a feedback manner by using the engine operating state and the basic timing θb thus corrected.

The basic timing correction permission part 37 permits a correction operation for the basic timing θb of the variable valve timing mechanism 13 when the operating state of the internal combustion engine 1 detected by the operating state detection part 33 is in a fuel cut-off state.

The target intake negative pressure setting part 38 determines, based on the rotational speed Ne of the internal combustion engine 1 detected by the rotation speed detection part 32, a target intake negative pressure PbT that should be set as an initial state of the correction operation for the basic timing θb when the correction operation for the basic timing θb is permitted by the basic timing correction permission part 37.

The control switching part 39 selects one of the driving control part 34 and the correction time driving control part 35 as a control system for the variable valve timing mechanism 13.

Specifically, the control switching part 39 selects, as the control system, the driving control part 34 at the time when the cam phase is controlled in a feedback manner according to the variable valve timing mechanism 13, and the correction time driving control part 35 in response to a switch command from the basic timing correction permission part 37 at the time of correction of the basic timing θb.

The intake air amount adjustment part 30 adjusts the amount of intake air sucked into the internal combustion engine 1 in such a manner that the target intake negative pressure PbT detected by the intake negative pressure detection part 31 coincides with the intake negative pressure Pb determined by the target intake negative pressure setting part 38.

The correction time driving control part 35 controls the variable valve timing mechanism 13 so as to be driven to advance after the intake negative pressure Pb is made to coincide with the predetermined target intake negative pressure PbT by means of the intake air amount adjustment part 30.

The basic timing correction part 36 calculates an intake negative pressure change index by using the intake negative pressure Pb detected by the intake negative pressure detection part 31 during the driving and controlling operation of the correction time driving control part 35, and corrects the basic timing θb based on the state of the variable valve timing mechanism 13 when the intake negative pressure change index exceeds a predetermined value (e.g., a predetermined threshold).

In FIG. 2, on the intake pipe 4, there are mounted an air cleaner 2 for purifying intake air sucked into the internal combustion engine 1, an air flow sensor 3 for measuring the amount of intake air sucked into the internal combustion engine 1, a throttle valve 5 for adjusting the amount of intake air (the output of the internal combustion engine 1), an injector 6 for supplying an amount of fuel corresponding to the amount of intake air, an intake pipe pressure sensor 23, and an idle speed control valve 24 (hereinafter referred to as an "ISC valve").

The intake pipe pressure sensor 23 detects a pressure (negative pressure) in the intake pipe 4 at a location downstream of the throttle valve 5.

The ISC valve 24 is arranged in parallel to the intake pipe 4 in a manner to bypass the throttle valve 5 to connect between an upstream portion and a downstream portion of the intake pipe 4, so that it is controlled to open and close based on a command from the ECU 17 thereby to adjust the amount of air flowing through the intake pipe 4.

On the other hand, on the exhaust pipe 7, there are mounted an oxygen sensor 8 for detecting the amount of residual oxygen contained in the exhaust gas, and a three way catalyst 9 for purifying harmful gas components (THC, CO, NOx) contained in the exhaust gas.

A spark plug 11 is mounted on a cylinder head with its electrodes presented in the combustion chamber 1*a* for generating a spark to burn the mixture therein.

The spark plug 11 is driven by high voltage energy generated from a ignition coil 10 when a current supplied to the ignition coil 10 is interrupted under the control of the ECU 17.

A cam angle detection sensor plate (not shown) is integrally mounted on the unillustrated camshaft, and a cam angle sensor 12 for detecting the rotational angle of a cam (hereinafter referred to as a cam angle) is arranged in an opposed relation to an outer peripheral portion of the cam angle detection sensor plate. The cam angle sensor 12 is composed of an electromagnetic pickup, etc., and serves to generate a pulse signal in response to a protrusion(s) (not shown) formed at a predetermined position(s) of the cam angle detection sensor plate.

The variable valve timing mechanism 13 is adjusted by an oil control valve 14 (hereinafter referred to as an "OCV") that is driven to operate under the control of the ECU 17.

The OCV 14 adjusts the hydraulic pressure supplied to the variable valve timing mechanism 13 thereby to control the relative angle of the camshaft to the crankshaft (the cam phase).

A crank angle detection sensor plate 16 with a protrusion (not shown) formed thereon at a predetermined position is integrally mounted on the crankshaft that is driven to rotate by the internal combustion engine 1, as in the case of the camshaft.

A crank angle sensor 15 for detecting the rotational position of the crankshaft is arranged in an opposed relation to the outer peripheral portion of the crank angle detection sensor plate 16.

The crank angle sensor 15 generates a pulse signal when the protrusion of the crank angle detection sensor plate 16 (corresponding to the crank angle) comes to oppose and cross the crank angle sensor 15.

The ECU 17 controls the cam phase through the OCV 14, and drives the throttle valve 5, the injector 6, the intake valve V1, and the exhaust valve V2 in an appropriate manner so that the operating state of the internal combustion engine 1 is properly controlled.

A pipe connected with an oil pump 18 is placed in communication with the OCV 14 so as to supply operating oil of a required pressure from the oil pump 18 to the OCV 14.

The oil pump 18 generates hydraulic pressure for driving the variable valve timing mechanism 13, and pressure feeds lubricating oil to respective portions of mechanical elements of the internal combustion engine 1.

A hydraulic pressure sensor 19 and an oil temperature sensor 20 are mounted on the pipe connecting between the OCV 14 and the oil pump 18.

The hydraulic pressure sensor 19 detects the hydraulic pressure of the oil that is pressure fed from the oil pump 18 to the OCV 14, and the oil temperature sensor 20 detects the temperature of the oil pressure fed from the oil pump 18 to the OCV 14.

A water temperature sensor 22 is mounted on the internal combustion engine 1 for detecting the temperature of cooling water 21 that serves to cool the internal combustion engine 1.

As shown in FIGS. 1 and 2, the control apparatus for an internal combustion engine according to the first embodiment of the present invention includes the intake valve V1 that is driven in synchronization with the rotation of the internal combustion engine 1 at timing with the predetermined phase difference thereby to open and close the intake pipe leading to the combustion chamber 1a of the internal combustion engine 1, the variable valve timing mechanism 13 that continuously adjusts the opening and closing timing of the intake valve V1 to the advance angle side and the retard angle side based on the predetermined basic timing θb, the various kinds of sensors 25 that detect various pieces of information on the operating state of the internal combustion engine 1, and the ECU 17 that controls the internal combustion engine 1, the variable valve timing mechanism 13, etc., based on the information detected by the various kinds of sensors 25.

The ECU 17 is provided with the variable valve timing control device 40 including the operating state detection part 33 for detecting the operating state of the internal combustion engine 1, and the variable valve timing control device 40 drives and controls the variable valve timing mechanism 13 based on the operating state of the internal combustion engine 1 thus detected.

Also, the ECU 17 is provided with the intake negative pressure detection part 31 for detecting the intake negative pressure Pb in the intake pipe 4 that varies in accordance with the adjustment of the opening and closing timing of the intake valve V1, and the rotation speed detection part 32 for detecting the rotational speed Ne of the internal combustion engine 1.

The variable valve timing control device 40 in the ECU 17 includes the basic timing correction permission part 37 that permits the correction operation for the basic timing θb when the operating state of the internal combustion engine 1 is in the fuel cut-off state, the target intake negative pressure setting part 38 that determines, based on the rotational speed Ne of the internal combustion engine 1, the target intake negative pressure PbT that should be set as an initial state of the correction operation for the basic timing θb when the correction operation for the basic timing θb is permitted by the basic timing correction permission part 37, the intake air amount adjustment part 30 that adjusts the amount of intake air sucked into the combustion chamber 1a so as to make the intake negative pressure Pb detected by the intake negative pressure detection part 31 coincide with the target intake negative pressure PbT, the correction time driving control part 35 that controls the variable valve timing mechanism 13 so as to be driven to advance after the intake negative pressure Pb is made to coincide with the predetermined target intake negative pressure PbT by means of the intake air amount adjustment part 30, and the basic timing correction part 36 that corrects the basic timing θb based on the state of the variable valve timing mechanism 13 when the intake negative pressure change index calculated by using the intake negative pressure Pb exceeds the predetermined value during the driving and controlling operation of the correction time driving control part 35.

Next, reference will be made to the valve timing control operation of the first embodiment of the present invention while referring to FIGS. 1 and 2.

First of all, the ECU 17 calculates a target amount of advance angle θT of the cam phase from the operating state of the internal combustion engine 1.

Also, the ECU 17 sets the absolute amount or value of a phase difference between the crank angle signal detected by the crank angle sensor 15 and the cam angle signal detected by the cam angle sensor 12 as a basic amount of advance angle θ, and calculates, as an actual amount of advance angle θa, a value that is obtained by subtracting the basic timing θb of the variable valve timing mechanism 13 from the basic amount of advance angle θ.

That is, the actual amount of advance angle θa means an amount by which the valve timing is displaced from the basic timing θb of the variable valve timing mechanism 13 to an advance angle side.

Accordingly, the actual amount of advance angle θa is represented by using the basic amount of advance angle θ and the basic timing θb, as shown in the following expression (1).

$$\theta a = \theta - \theta b \quad (1)$$

Hereinafter, a deviation between the actual amount of advance angle θa and the target amount of advance angle θT calculated from expression (1) above is controlled in a feedback manner so that the value of current (or duty ratio) supplied to the OCV 14 is thereby controlled to make the actual amount of advance angle θa coincide with the target amount of advance angle θT. Such control is called "phase feedback control" in the following.

Here, note that the OCV 14 serves to select an appropriate oil path to the variable valve timing mechanism 13 so as to adjust the hydraulic pressure impressed thereto, whereby the opening and closing timing of the intake valve V1, being driven to open and close through the variable valve timing mechanism 13, can be controlled in an appropriate manner.

Next, reference will be made to a detection principle for the basic timing θb of the variable valve timing mechanism 13 while referring to FIG. 3.

Figure 3:
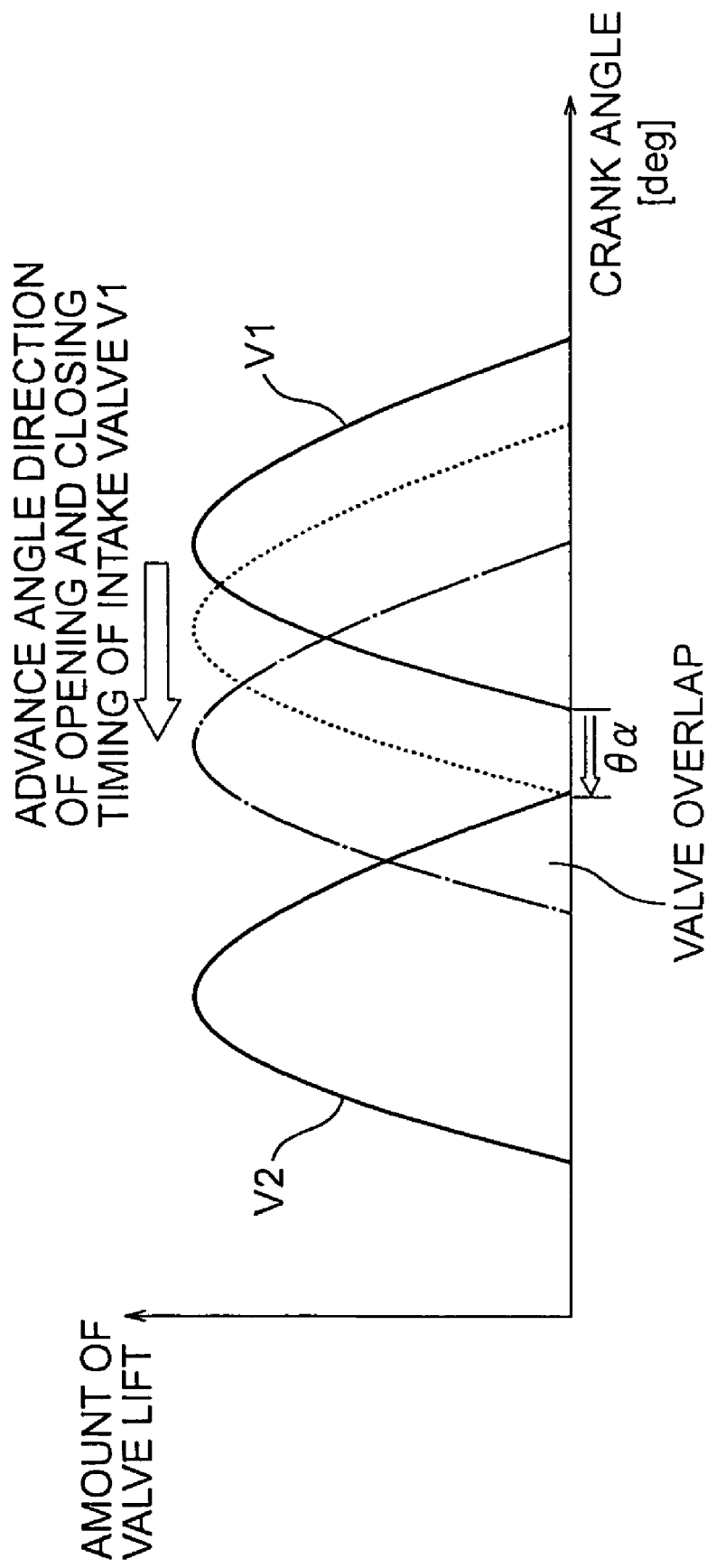
FIG. 3 is an explanatory view showing a relation between the amounts of lift of an intake valve and an exhaust valve with respect to a crank angle according to the first embodiment of the present invention.

FIG. 3 is an explanatory view that shows the relation between the amounts of lift of the intake valve V1 and the exhaust valve V2 with respect to the crank angle according to the first embodiment of the present invention.

In FIG. 3, the axis of abscissa is the crank angle and the axis of ordinate is the amounts of valve lift, wherein there will not occur a state in which the intake valve V1 is opened at the same time when the exhaust valve V2 is opened (so-called "valve overlap"), even if an opening and closing operation curve (open timing property) of the intake valve V1 is advanced by an amount of displacement θα from its solid line position to its dotted line position.

Accordingly, in a state where the opening and closing operation curve of the intake valve V1 is made to advance by the amount of displacement θα, the intake negative pressure Pb of the internal combustion engine 1 during the fuel cut-off operation thereof is held constant.

On the other hand, when the opening and closing timing of the intake valve V1 is gradually made to advance up to the timing as indicated by the alternate long and short dash line in FIG. 3, it interferes with the opening and closing timing of the exhaust valve V2, thus generating a "valve overlap" state.

Further, as the amount of advance angle of the opening and closing timing of the intake valve V1 increases, the amount of overlap increases, too.

At this time, as the amount of overlap (the amount of advance angle) increases, the amount of the exhaust gas flowing backward to the intake pipe 4 increases, too, so the intake negative pressure Pb of the internal combustion engine 1 decreases.

Next, reference will be made to the behaviors of various kinds of parameters at the time of an angle advancing operation of the intake valve V1 while referring to FIG. 4.

Figure 4:
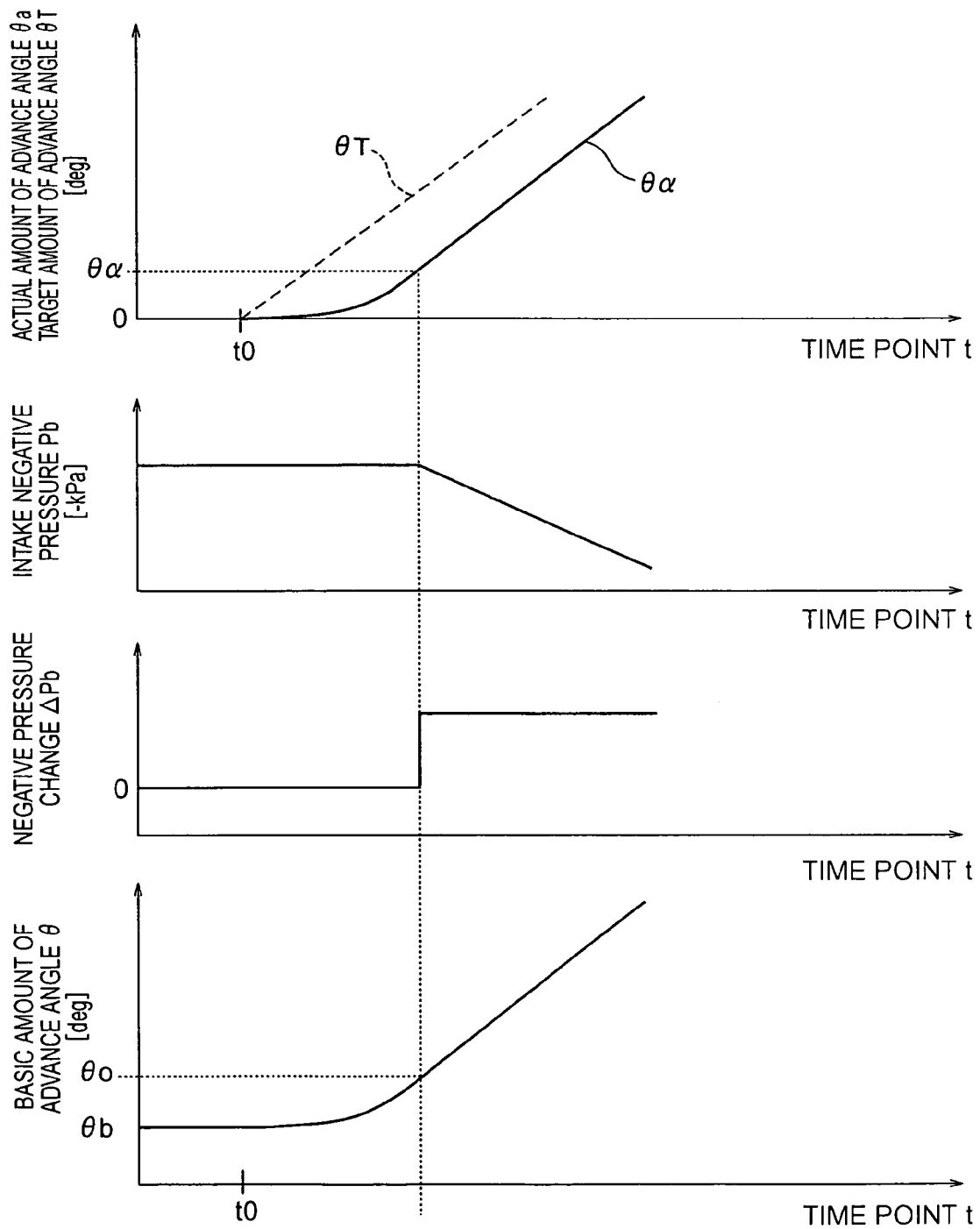
FIG. 4 is a timing chart showing the changes over time of various kinds of parameters (intake negative pressure Pb, etc.) at the time of an angle advancing operation of the intake valve according to the first embodiment of the present invention.

FIG. 4 is a timing chart that shows the changes over time of various kinds of parameters (intake negative pressure Pb, etc.) at the time of the angle advancing operation of the intake valve V1, wherein there is illustrated an example of increasing the target amount of advance angle θT of the variable valve timing control device 40 at a fixed rate with respect to time t.

Here, note that the target amount of advance angle θT of the variable valve timing control device 40 (see a broken line) in the ECU 17 is shown as being increased at the fixed rate with respect to time t.

In addition, the axis of abscissa corresponds to time t, and the axes of ordinate represent the changes over time of individual values (the target amount of advance angle θT, the actual amount of advance angle θa, the intake negative pressure Pb, a negative pressure change ΔPb, and the basic amount of advance angle θ).

In this case, the negative pressure change ΔPb used as the intake negative pressure change index is the amount of change of the intake negative pressure Pb from the last time point "t−1" to the current time point "t", and is represented by the following expression (2) by using an intake negative pressure Pb (t−1) at the last time point and an intake negative pressure Pb(t) at the current time point.

$$\Delta Pb = Pb(t-1) - Pb(t) \tag{2}$$

In FIG. 4, the ECU 17 first performs the phase feedback control of the variable valve timing mechanism 13 while increasing the target amount of advance angle θT (see the broken line). As a result, the actual amount of advance angle θa (see the solid line) also increases following the target amount of advance angle θT.

At this time, the intake negative pressure Pb begins to decrease from the instant when the actual amount of advance angle θa has increased by the amount of displacement θα (see the dotted line). That is, the actual amount of advance angle θa at a time point indicated by the dotted line corresponds to the amount of displacement θα from a solid line position to a dotted line position of the opening and closing timing of the intake valve V1, as shown in FIG. 3.

Similarly, as the actual amount of advance angle θa increases, the basic amount of advance angle θ increases, too.

At this time, the basic amount of advance angle θ begins to increase (advance) from the basic timing θb, and the intake negative pressure Pb decreases from a time point at which the basic amount of advance angle θ has reached a start timing θo of a valve overlap (see the dotted line).

Further, as the basic amount of advance angle θ is increased, the intake negative pressure Pb accordingly decreases, too.

In the first embodiment of the present invention, as a method of detecting the start timing θo of the valve overlap (see the dotted line) from a time point at which the target amount of advance angle θT (see the broken line) indicates "0", there is employed the above-mentioned negative pressure change ΔPba, i.e., the difference between the last intake negative pressure Pb(t−1) at the one preceding (last) measurement time point "t−1" and the current intake negative pressure Pb(t) at the current measurement time point "t".

As shown in FIG. 4, the basic amount of advance angle θ at a time point at which the value of the negative pressure change ΔPb changes suddenly is the start timing θo of the valve overlap.

Accordingly, the basic amount of advance angle θ directly indicates the opening and closing timing of the intake valve V1 of the internal combustion engine 1, and the negative pressure change ΔPb in accordance with the opening and closing timing can be assumed to be the "intake negative pressure change index".

Figure 5:
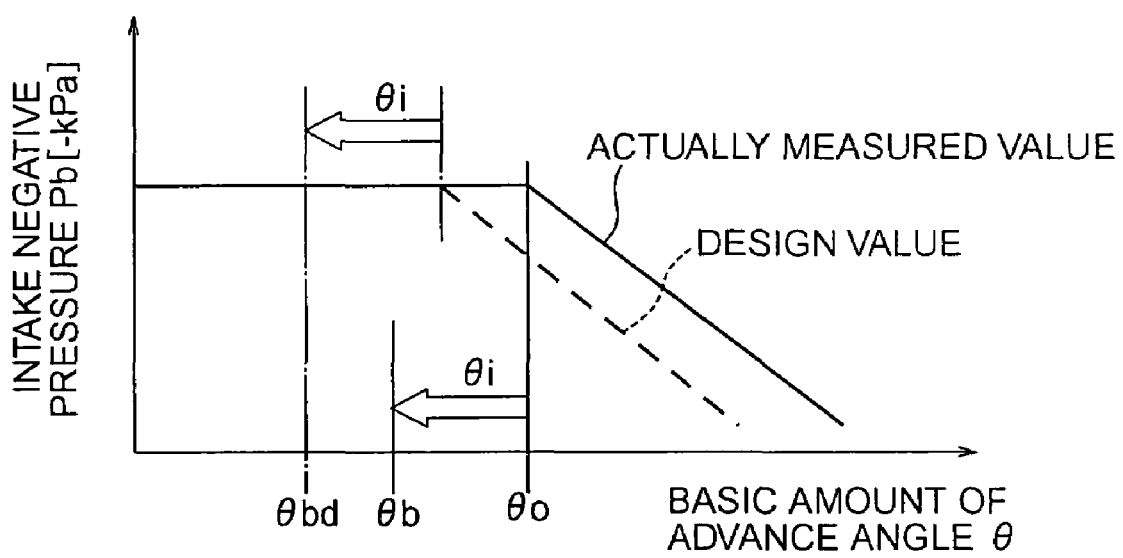
FIG. 5 is an explanatory view showing a relation between the amount of basic advance angle and the intake negative pressure according to the first embodiment of the present invention.

FIG. 5 is an explanatory view that shows a relation between the basic amount of advance angle θ (the axis of abscissa) and the intake negative pressure Pb (the axis of ordinate), where there are illustrated characteristics when the crank angle sensor 15 and the cam angle sensor 12 are arranged around the censor plates 16, 13, respectively, with some tolerances being allowed in the circumferential direction of the sensor plates, and a broken line represents a characteristic based on design values, and a solid line represents a characteristic based on measured values.

Here, note that in FIG. 5, the actual basic timing θb of the basic amount of advance angle θ can be a timing different from a design median value θbd of the basic timing, depending on the allowable tolerances of the crank angle sensor 15 and the cam angle sensor 6 upon mounting thereof with respect to the circumferential directions of the individual sensor plates on the crankshaft and the camshaft, respectively.

The design median value θbd of the basic timing θb of the variable valve timing mechanism 13 is set to a timing θi apart a predetermined crank angle from the start timing θo of the valve overlap. The predetermined crank angle determining the timing θi is decided beforehand at the time of designing the internal combustion engine 1.

However, the component parts of the internal combustion engine 1 are each installed or mounted, upon assembly thereof, while generally allowing a tolerance with respect to its design median value, so there will be a deviation generated between the design median value θbd and the actual basic timing θb, as shown in FIG. 5.

The actual basic timing θb is calculated by the following expression (3) using the start timing θo and the prescribed timing θi of the valve overlap after the start timing θo of the valve overlap is detected according to the above-mentioned procedure.

$$\theta b = \theta o - \theta i \tag{3}$$

Although the variable valve timing control device 40 in the ECU 17 performs the phase feedback control of the variable valve timing mechanism 13 as previously stated, the basic timing applied to the phase feedback control at this time is not the design median value θbd but the actual basic timing θb acquired from the "intake negative pressure change index" that directly indicates the opening and closing timing of the intake valve V1 of the internal combustion engine 1.

Accordingly, by performing the phase feedback control using the actual basic timing θb of the variable valve timing mechanism 13, it is possible to maximize the output performance and the exhaust or emission performance of the internal combustion engine 1 while allowing the tolerances of the various component parts.

Now, reference will be made to the operation of the ECU 17 for correcting the basic timing θb according to the first embodiment of the present invention while referring to a flow chart of FIG. 6.

Here, it is assumed that a correction completion flag FL is set in advance in such a manner that when the basic timing θb of the variable valve timing mechanism 13 has not yet been corrected, the value of the correction completion flag FL is set to "0", and when the basic timing θb has already been corrected, it is set to "1".

Figure 6:
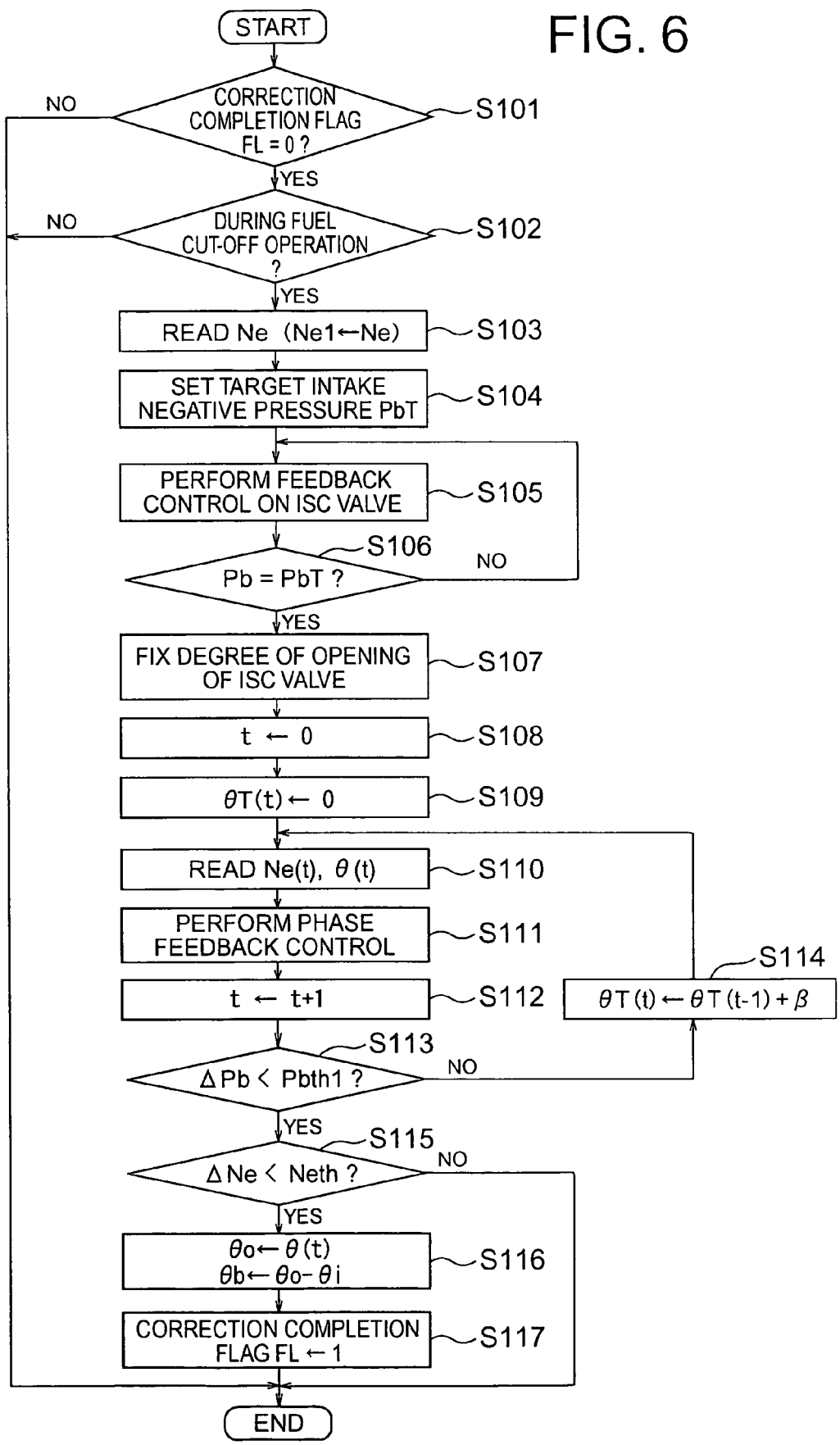
FIG. 6 is a flow chart illustrating a basic timing correcting operation according to the first embodiment of the present invention.

First of all, it is determined whether the correction completion flag FL is "0" (step S101), and when determined as FL=1 (that is, NO), it is assumed that the basic timing θb has already been corrected and new correction is not required, and the processing routine of FIG. 6 is terminated.

On the other hand, when determined as the correction completion flag FL=0 (that is, YES), it is subsequently determined whether the operating state of the internal combustion engine 1 is in a fuel cut-off state (the detection condition of the basic timing θb is satisfied) (step S102).

When it is determined in step S102 that the engine operating state is not in a fuel cut-off state (that is, NO), it is assumed that the detection condition of the basic timing θb of the variable valve timing mechanism 13 is not satisfied, and hence the processing routine of FIG. 6 is terminated.

On the other hand, when it is determined in step S102 that the engine operating state is in a fuel cut-off state (that is, YES), the rotational speed Ne of the internal combustion engine 1 is read from the operating state detection part 33 and stored as a speed or rate parameter Ne1 for temporary storage (step S103).

Subsequently, a target value of the intake negative pressure Pb is obtained from the rotational speed Ne, so that it is set as a target intake negative pressure PbT (step S104).

Here, note that if an excessively large value is set as the target intake negative pressure PbT, a rapid deceleration feeling might be provided for the driver, or oil might be drawn into the combustion chamber 1a, so in consideration of these circumstances, an appropriate value is set beforehand experimentally with respect to the magnitude of the rotational speed Ne.

Then, the ISC valve 24 is adjusted in such a manner that the actual intake negative pressure Pb detected by the intake negative pressure detection part 31 is controlled in a feedback manner so as to coincide with the target intake negative pressure PbT (step S105).

Thereafter, it is determined whether the detected actual intake negative pressure Pb coincides with the target intake negative pressure Pb (step S106), and when it is determined that both do not coincide with each other (that is, NO), a return is carried out to step S105.

On the other hand, when it is determined as Pb=PbT in step S106 (that is, YES), it is assumed that the correction condition of the basic timing θb holds, and the degree of opening of the ISC valve 24 is fixed (step S107).

Subsequently, the time point parameter t corresponding to the correction procedure of the basic timing θb is set to "0" (step S108), and the target amount of advance angle θT(t) in the variable valve timing control device 40 is set to "0" (step S109).

By executing these steps S108 and S109, the variable valve timing control device 40 carries out the phase feedback control whereby the basic amount of advance angle θ(t) becomes the latest opening and closing timing.

Then, the variable valve timing control device 40 reads out the rotational speed Ne(t) of the internal combustion engine 1 from the operating state detection part 33, and at the same time reads out the basic amount of advance angle θ(t) (step S110), performs the phase feedback control (step S111), and increments the time point parameter t (increases it by "1") (step S112).

Then, a difference between the current intake negative pressure Pb(t) at the current time t and the last intake negative pressure Pb(t−1) at the one preceding (last) processing time point (e.g., 10 msec ago) is calculated as a negative pressure change ΔPb, as shown in the above-mentioned expression (2), and it is determined whether the negative pressure change ΔPb has exceeded a predetermined threshold Pbth1 (a change determination reference for the intake negative pressure Pb) (step S113).

When it is determined as ΔPb≦Pbth1 in step S113 (that is, NO), it is assumed that no change in the intake negative pressure Pb is recognized with respect to the change in the valve timing, so the target amount of advance angle θT(t) is increased by a predetermined amount β to "θT(t−1)+β", and a return to step S110 is carried out (step S114).

If the next phase feedback control (step S111) is carried out after execution of the step S114, the actual valve timing can be changed into a further advance angle side.

On the other hand, when it is determined as ΔPb>Pbth1 in step S113 (that is, YES), it is assumed that the intake negative pressure Pb is changed by the change in the valve timing. Subsequently, the absolute value |Ne1−Ne(t)| of a deviation between the speed or rate parameter Ne1 stored in step S103 and the latest rotational speed Ne(t) read out in step S110 is calculated as a speed change ΔNe, and it is determined whether the speed change ΔNe is smaller than a threshold Neth (a change determination reference for the rotational speed Ne) (step S115).

When it is determined as ΔNe≧Neth in step S115 (that is, NO), it is assumed that the engine operating state is unstable, so a series of correction processing for the basic timing θb is nullified, and the processing routine of FIG. 6 is terminated.

On the other hand, when it is determined as ΔNe<Neth (that is, YES), it is assumed that the change in the rotational speed Ne of the internal combustion engine 1 is small to a satisfactory extent (the operating state is steady) over a period of time in which the relation of the intake negative pressure Pb to the basic amount of advance angle θ is investigated, and the control flow proceeds to step S116.

In step S116, the basic amount of advance angle θ(t) at a time point when the negative pressure change ΔPb (>Pbth1) is recognized is set as a start timing θo of a valve overlap, and the value (=θo−θi) obtained from the above-mentioned expression (3) is set as a basic timing θb by using the start timing θo and a predetermined timing θi (step S116).

Here, note that the predetermined timing θi corresponds to a crank angle from the basic timing θb of the variable valve timing mechanism 13 to the start timing θo of the valve overlap, and is a value determined in advance at the time of designing the internal combustion engine 1.

Finally, the correction completion flag FL is set to "1" (step S117), and the processing routine of FIG. 6 is terminated.

As described above, according to the variable valve timing control device 40 in the ECU 17 of the first embodiment of the present invention, upon detection of the intake negative pressure Pb, the variable valve timing mechanism 13 is controlled to be driven during a fuel cut-off operation which does not contribute to the combustion of the internal combustion engine 1, so no defective combustion is generated, thus making it possible to suppress an increase of harmful components in the exhaust gas.

In addition, since defective combustion is not generated, it is possible to prevent the variation of the intake negative pressure Pb and engine stall due to a rough idle state, and hence the basic timing θb of the variable valve timing mechanism 13 can be corrected in a highly precise manner.

Further, since the correction of the basic timing θb is not effected by using a mechanically engaged position, it is possible to correct the basic timing θb of the variable valve timing mechanism 13 with a high degree of precision without depending on mechanical errors of component parts.

Embodiment 2

Although in the above-mentioned first embodiment, only the state in which the rotational speed Ne of the internal combustion engine 1 is stable is made a correction enabling condition of the basic timing θb of the variable valve timing mechanism 13, it may be constructed such that correction can be made even in a state in which the rotational speed Ne of the internal combustion engine 1 is changing.

In general, the fuel cut-off state is often a deceleration state in which the rotational speed Ne of the internal combustion engine 1 is decreased, so the chances of correction become small with the above-mentioned correction condition of the first embodiment.

Accordingly, it is desirable to make the state of the changing rotational speed Ne of the internal combustion engine 1 a correction enabling condition of the basic timing θb.

Hereinafter, reference will be made to a control apparatus for an internal combustion engine according to a second embodiment of the present invention in which the basic timing θb can be corrected even in the changing state of the rotational speed Ne, while referring to FIGS. 7 through 11 together with FIGS. 1 and 2.

In this case, the variable valve timing control device 40 in the ECU 17 includes an intake negative pressure correction amount calculation part (not shown) that serves to correct the intake negative pressure Pb used to calculate the intake negative pressure change index.

The intake negative pressure correction amount calculation part in the ECU 17 calculates an amount of correction of negative pressure $KPb(Ne, \theta)$ (hereinafter referred to simply as "the amount of correction") to correct the intake negative pressure Pb by using the rotational speed Ne detected by the rotation speed detection part 32 and the amount of displacement of the variable valve timing mechanism 13.

First of all, reference will be made to a relation between the basic amount of advance angle θ of the variable valve timing mechanism 13 during a fuel cut-off operation and the intake negative pressure Pb.

Figures 7, 8:
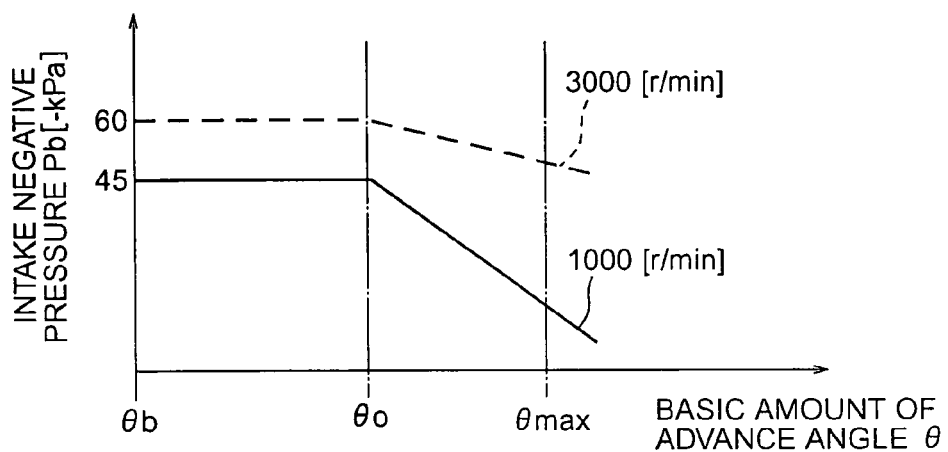
FIG. 7 is an explanatory view related to a second embodiment of the present invention, in which a relation between the amount of basic advance angle and the intake negative pressure is shown when the degree of opening of an ISC valve is made constant.
FIG. 8 is an explanatory view showing a setting example of the amount of correction of the intake negative pressure applied to the second embodiment of the present invention.

FIG. 7 is an explanatory view that shows the relation between the basic amount of advance angle θ and the intake negative pressure Pb at the time when the degree of opening of the ISC valve 24 is made constant, wherein a solid line represents a characteristic at a low rotational speed (1,000 [r/min]) and a broken line represents a characteristic at a high rotational speed (3,000 [r/min]).

In FIG. 7, the intake or suction performance of the internal combustion engine 1 becomes high when the rotational speed Ne of the internal combustion engine 1 rises (see the broken line), so the ratio of the decreased amount of the intake negative pressure Pb to the increased amount of the basic amount of advance angle θ (the slope of the characteristic) at an advance angle side from the start timing θo of the valve overlap becomes smaller at the high rotational speed than at the low rotational speed Ne (see the solid line).

In addition, the intake negative pressure Pb during the fuel cut-off operation under deceleration becomes large (near vacuum), as previously stated, so the driver is prevented from being subjected to an abnormal deceleration feeling, and it is necessary to control the ISC valve 24 to be opened so as to prevent the entry of oil into the combustion chamber 1a. Accordingly, the intake negative pressure Pb with respect to an actual amount of advance angle θa (=0), which becomes an initial state, in the correction processing of the basic timing θb varies in accordance with the rotational speed Ne.

In other words, when the rotational speed Ne of the internal combustion engine 1 changes with the ISC valve 24 being fixed during the fuel cut-off operation under deceleration, the intake negative pressure Pb is caused to change even if the basic amount of advance angle θ is set to a fixed value, so when the variable valve timing mechanism 13 is operated under such a condition, the relation of the intake negative pressure Pb to the basic amount of advance angle θ is not decided uniquely.

Accordingly, it is necessary to calculate a corrected intake negative pressure Pbc by correcting the measured intake negative pressure Pb by the use of the rotational speed Ne of the internal combustion engine 1 and the basic amount of advance angle θ, so that the measured intake negative pressure Pb is made to coincide with the relation between the basic amount of advance angle θ and the intake negative pressure Pb measured at a reference rotational speed Ne.

Specifically, the corrected intake negative pressure Pbc is calculated according to the following expression (4) by using the intake negative pressure Pb and the amount of correction $KPb(Ne, \theta)$.

$$Pbc = Pb - KPb(Ne, \theta) \quad (4)$$

The amount of correction $KPb(Ne, \theta)$ in expression (4) above is set in accordance with the rotational speed Ne of the internal combustion engine 1 and the basic amount of advance angle θ, for instance, as shown in FIG. 8.

FIG. 8 is an explanatory view that shows a setting example of the amount of correction $KPb(Ne, \theta)$ applied to the second embodiment of the present invention.

In FIG. 8, the amount of correction $KPb(Ne, \theta)$ is composed of two-dimensional map data corresponding to the rotational speed Ne and the basic amount of advance angle θ, and is a value that is experimentally set beforehand from the characteristic of the internal combustion engine 1.

In the example of FIG. 8, the differences of the rotational speed Ne of the internal combustion engine 1 from the intake negative pressure Pb obtained, based on the state of a rotational speed of 1,000 [r/min], at other rotational speeds (1,500 [r/min], . . . , 3,000 [r/min], . . . , 7,000 [r/min]) are set, respectively, for the individual values of the rotational speed Ne and for the individual values of the basic amount of advance angle θ (0 [deg], 5 [deg], 10 [deg], . . . ).

Accordingly, the corrected intake negative pressure Pbc corrected by using the amount of correction $KPb(Ne, \theta)$ shown in FIG. 8 becomes equal to a value obtained at a rotational speed Ne of 1,000 [r/min] even if the rotational speed Ne of the internal combustion engine 1 during the fuel cut-off operation takes any value (i.e., is varying).

Next, reference will be made to a detection principle for the basic timing θb of the variable valve timing mechanism 13 according to the second embodiment of the present invention while referring to FIGS. 9 and 10.

Figure 9:
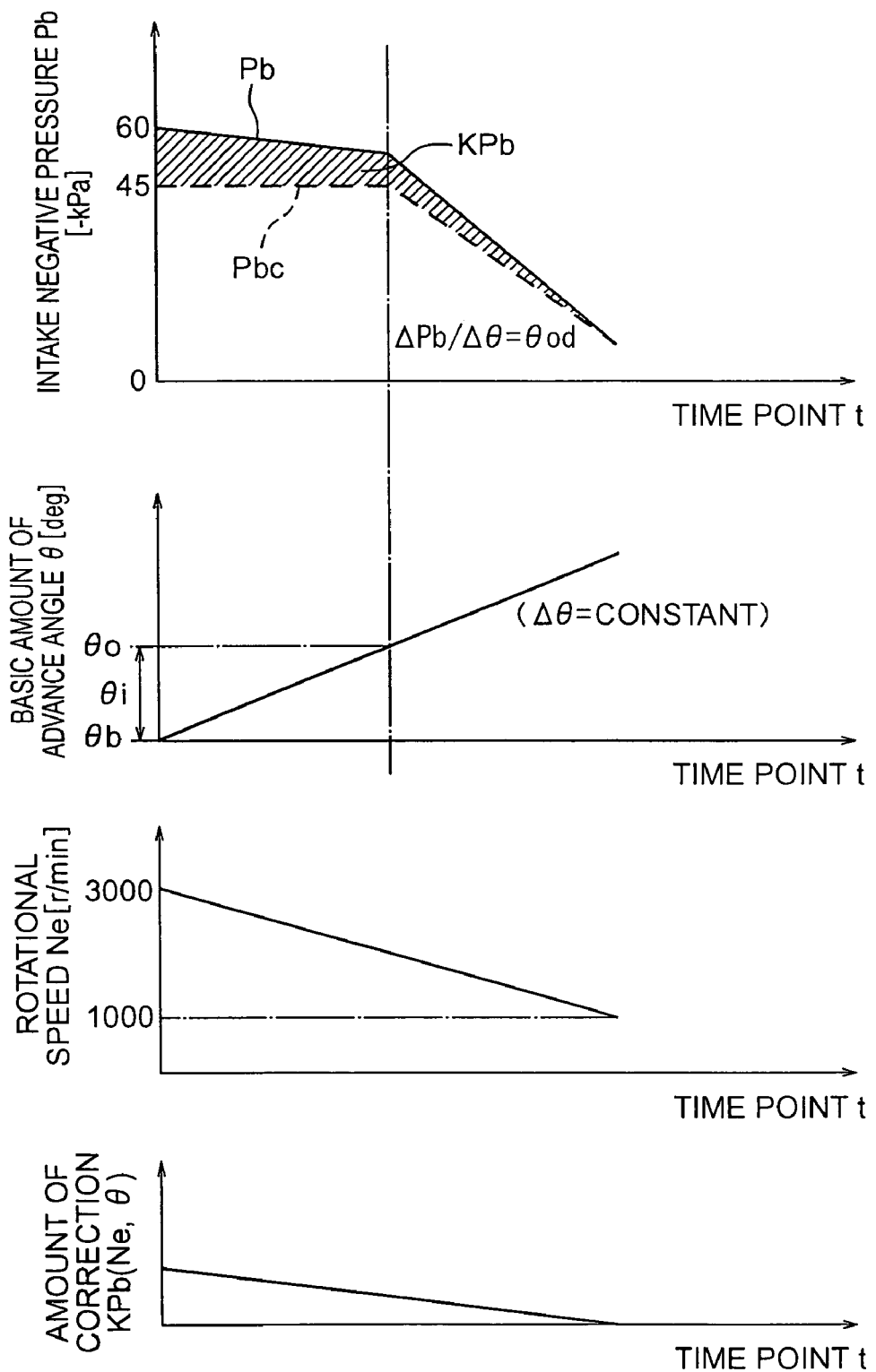
FIG. 9 is a timing chart illustrating the operation of a variable valve timing control device according to the second embodiment of the present invention when the basic timing coincides with a design median value.
Figure 10:
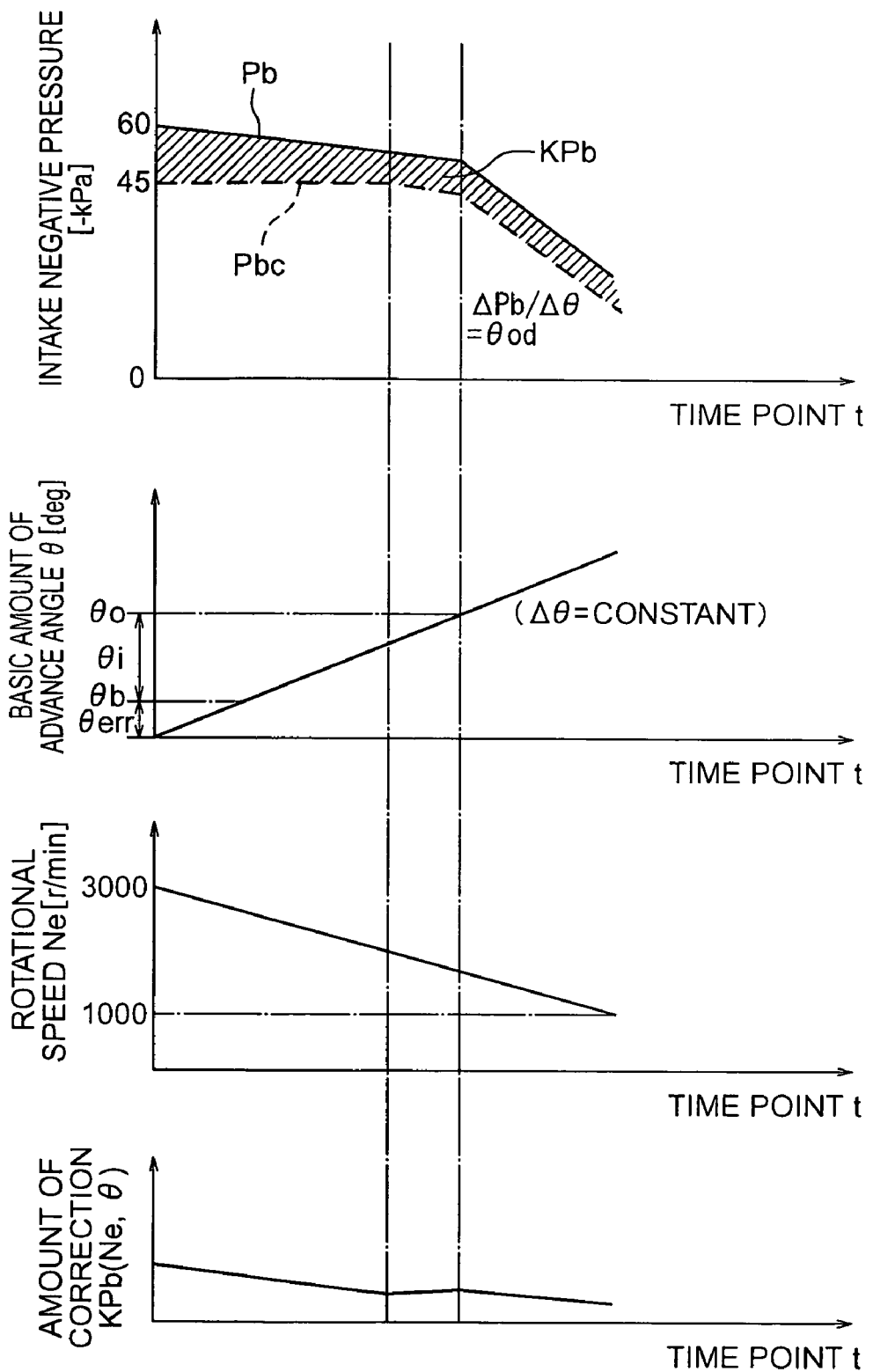
FIG. 10 is a timing chart illustrating the operation of the variable valve timing control device according to the second embodiment of the present invention when the basic timing is displaced from the design median value to a retard angle side.

FIGS. 9 and 10 are timing charts illustrating the operation of the ECU 17 (the variable valve timing control device 40) according to the second embodiment of the present invention, wherein the behavior of the intake negative pressure Pb is shown when the variable valve timing mechanism 13 is operated with the rotational speed Ne of the internal combustion engine 1 being decreased.

FIG. 9 shows a case where the basic timing θb of the variable valve timing mechanism 13 coincides with the design median value θbd.

Also, FIG. 10 shows a case where the basic timing θb of the variable valve timing mechanism 13 is deviated by an amount of error θerr to a retard angle side from the design median value.

In FIGS. 9 and 10, the rotational speed Ne, which becomes a reference for correction, is 1,000 [r/min], similarly as described above.

In addition, the amount of change θod of the intake negative pressure Pb (intake negative pressure change amount) with respect to the basic amount of advance angle θ when the basic amount of advance angle θ is in advance of the start timing θo of the valve overlap is calculated according to the following expression (5) by using the change ΔPb of the intake negative pressure Pb and the change Δθ of the basic amount of advance angle θ(to be described later).

$$\theta od = \Delta Pb/\Delta\theta \qquad (5)$$

At this time, the basic amount of advance angle θ, which begins to become the amount of intake negative pressure change θod, is the actual start timing θo of the valve overlap, as is clear from FIGS. 9 and 10.

Accordingly, a desired basic timing θb (=θo−θi) can be obtained based on the actual start timing θo of the valve overlap by using the above-mentioned expression (3), similar to the processing procedure shown in the above-mentioned first embodiment.

Now, reference will be made to the operation of the variable valve timing mechanism 13 for correcting the basic timing θb according to the second embodiment of the present invention while referring to a flow chart of FIG. 11.

Figure 11:
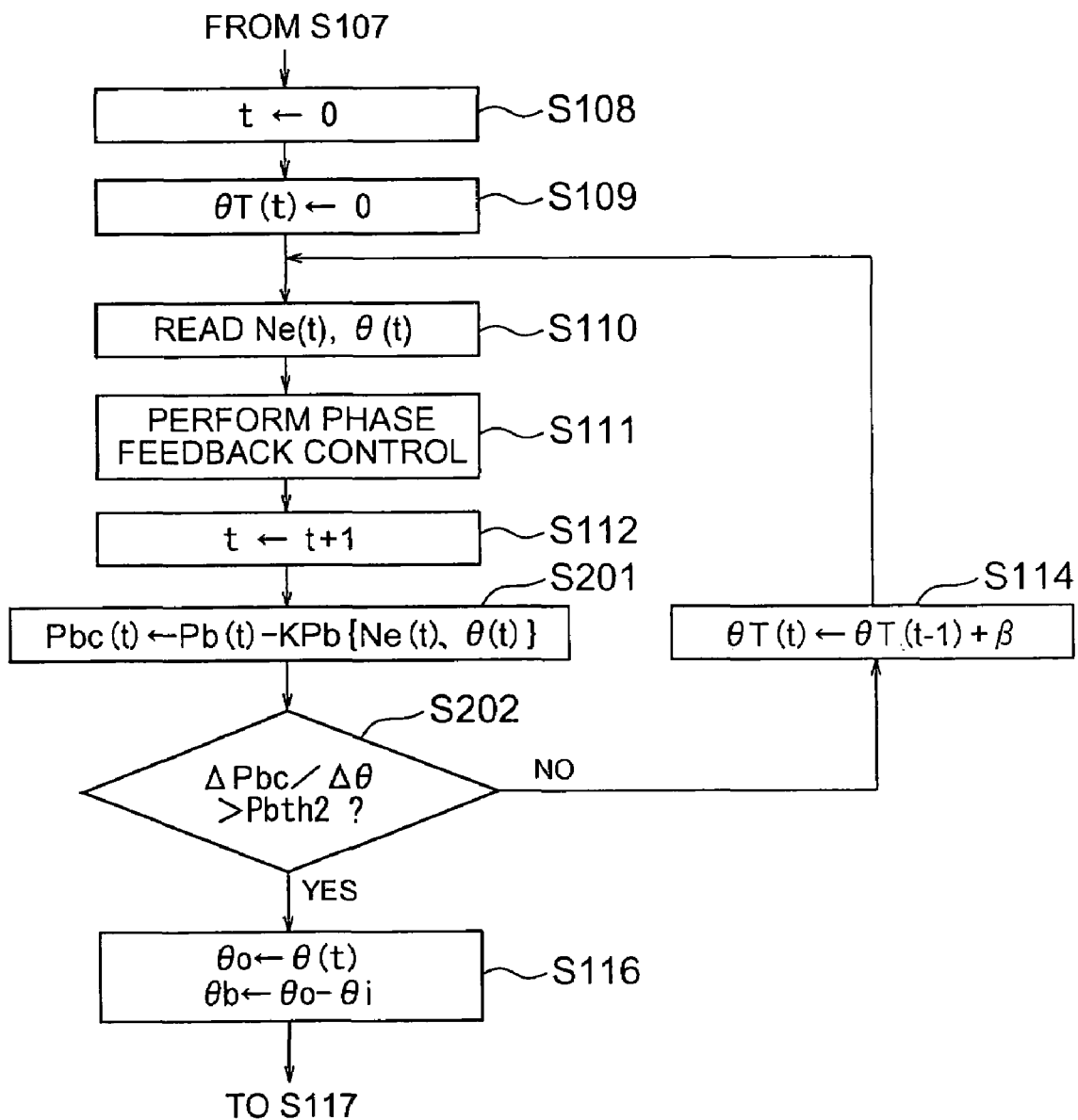
FIG. 11 is a flow chart illustrating a basic timing correcting operation according to the second embodiment of the present invention.

FIG. 11 shows only the processing from the above-mentioned step S108 onward (see FIG. 6), while unillustrated steps S101 through S107 and S117 are similar to the above-mentioned ones. In addition, the same or like processing steps as those described above are identified by the same symbols while omitting a detailed description thereof.

In FIG. 11, following the increment processing of the time point parameter t (step S112), the intake negative pressure Pb(t) measured at time point t is corrected by using the rotational speed Ne and the basic amount of advance angle θ of the internal combustion engine 1 to calculate a corrected intake negative pressure Pbc(t) (step S201).

Specifically, the corrected intake negative pressure Pbc(t) at the time point parameter t is calculated according to the following expression (6), similar to the above-mentioned expression (4).

$$Pbc(t) = Pb(t) - KPb\{Ne(t), \theta(t)\} \qquad (6)$$

Then, a difference (=Pbc(t−1)−Pbc(t)) between the current corrected intake negative pressure Pbc(t) and the corrected intake negative pressure Pbc(t−1) at the one preceding (last) processing time point (t−1) is calculated as a corrected negative pressure change ΔPbc.

Also, a difference (=θ(t−1)−θ(t)) between the current basic amount of advance angle θ(t) and the last basic amount of advance angle θ(t−1) at the one preceding processing time point (t−1) is calculated as an advance angle amount change Δθ.

Thereafter, it is determined whether a value, which becomes an intake negative pressure change index, i.e., a value (=ΔPbc/Δθ) obtained by dividing the corrected negative pressure change ΔPbc by the advance angle amount change Δθ exceeds a threshold Pbth2 (predetermined value) for determination of a change in the intake negative pressure Pb (step S202).

Here, note that the threshold Pbth2 is set to a value that is slightly smaller than the amount of intake negative pressure change θod so as to determine a change corresponding to the amount of intake negative pressure change θod.

When it is determined as ΔPbc/Δθ>Pbth2 in step S202 (that is, YES), the control flow proceeds to the above-mentioned step S116 where the processing of setting the start timing θo of the valve overlap and the processing of correcting the basic timing θb are carried out.

On the other hand, when it is determined as ΔPbc/Δθ≦Pbth2 in step S202 (that is, NO), the control flow proceeds to the above-mentioned step S114 where the target amount of advance angle θT(t) is increased, and the basic amount of advance angle θ(t) is further advanced.

As described above, according to the processing of the ECU 17 (the variable valve timing control device 40) of the second embodiment of the present invention, the corrected intake negative pressure Pbc is calculated by correcting the measured intake negative pressure Pb by the use of the rotational speed Ne of the internal combustion engine 1 and the basic amount of advance angle θ, so that the measured intake negative pressure Pb is made to coincide with the relation between the basic amount of advance angle θ and the intake negative pressure Pb measured at a reference rotational speed Ne. Thus, even in a process in which the rotational speed Ne of the internal combustion engine 1 changes, it is possible to detect the start timing θo of the valve overlap in an accurate manner.

Accordingly, even when the rotational speed Ne of the internal combustion engine 1 changes, the basic timing θb of the variable valve timing mechanism 13 can be corrected, thereby making it possible to ensure a lot of chances of correction.

Embodiment 3

In the above-mentioned first and second embodiments, no particular consideration has been given to a delay time in the change of the intake negative pressure Pb in case where the volume of the intake pipe 4 is large, but such a delay time of the intake negative pressure Pb may be compensated for.

Hereinafter, reference will be made to a control apparatus for an internal combustion engine according to a third embodiment of the present invention in which a delay time of the intake negative pressure Pb is compensated for, while referring to FIG. 2 and FIGS. 12 through 18.

Figure 12:
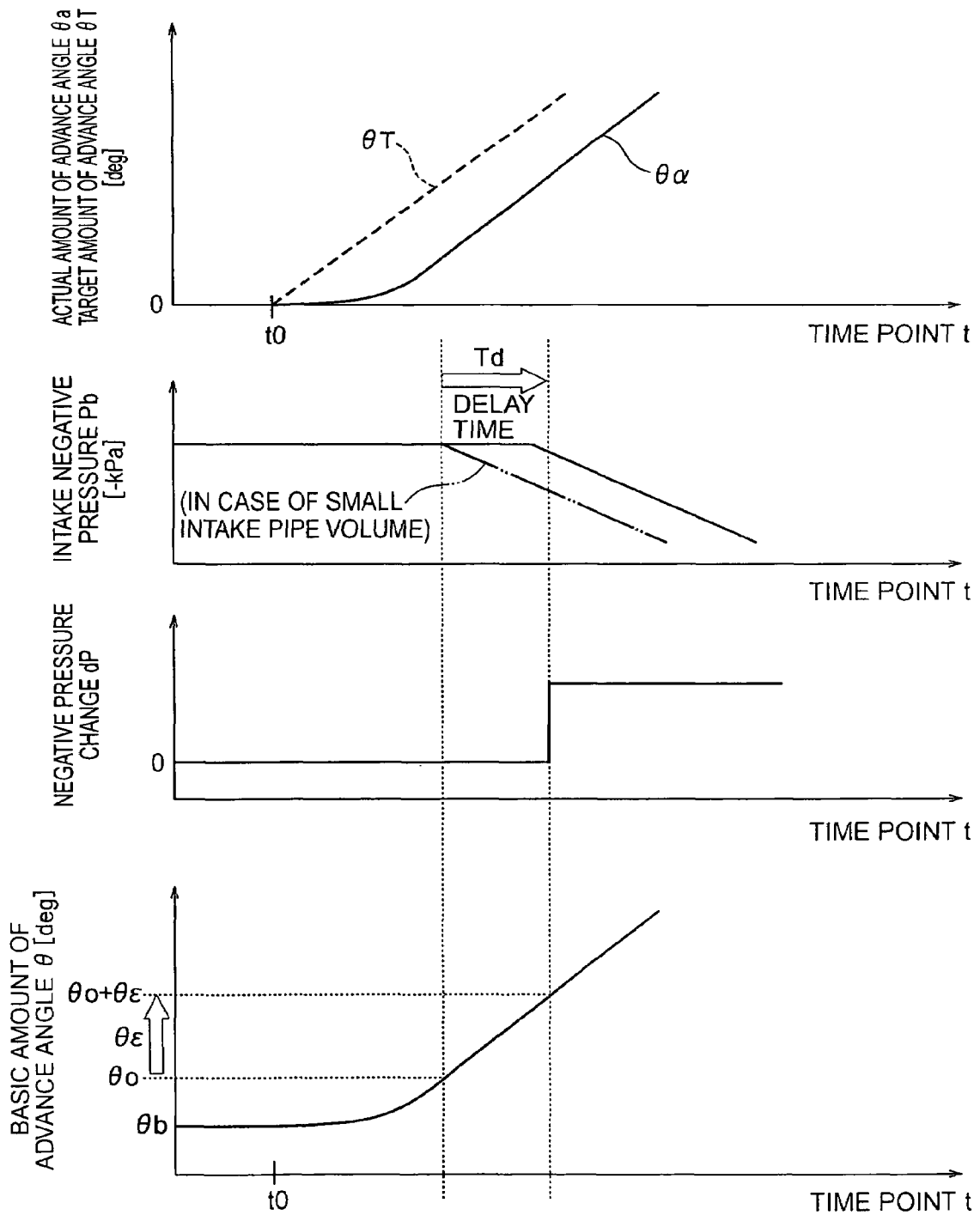
FIG. 12 is a timing chart illustrating an influence due to a delay time of intake negative pressure related to a third embodiment of the present invention.

FIG. 12 is a timing chart that illustrates an influence due to a delay time Td of the intake negative pressure Pb related to the third embodiment of the present invention, wherein there is shown a relation between the basic amount of advance angle θ and the intake negative pressure Pb when the volume of the intake pipe 4 is large and when the rotational speed Ne of the internal combustion engine 1 is in a constant state.

Also, the change of the intake negative pressure Pb at the time when the volume of the intake pipe 4 is small (see an alternate long and two short dashes line) is shown for the sake of convenience in understanding the change of the intake negative pressure Pb at the time when the volume of the intake pipe 4 is large (see a solid line).

In general, in case where the volume of the intake pipe 4 is large, the delay time Td from a time point at which the basic amount of advance angle θ of the variable valve timing mechanism 13 has changed until a time point at which the intake negative pressure Pb changes becomes remarkable.

This is because when the volume of the intake pipe 4 is large, the amount of air accumulated in the intake pipe 4 is large, so even if the exhaust gas flows back to the intake pipe 4 due to a change in the valve timing, an influence on a sum total of the amounts of gases filled in the intake pipe 4 is momentarily small.

Accordingly, when the relation between the basic amount of advance angle θ and the intake negative pressure Pb in the case of the large intake pipe volume is investigated in a time series manner according to the processing of the above-mentioned first and second embodiments, there will be an error θε for the detection of the start timing θo of the valve overlap resulting from the delay time Td of the intake negative pressure Pb, as shown in FIG. 12.

In addition, when the basic timing θb of the variable valve timing mechanism 13 is corrected with the rotational speed Ne of the internal combustion engine 1 changing, as shown in the above-mentioned second embodiment, the intake or suction performance of the internal combustion engine 1 is changed by the rotational speed Ne, so the delay time Td is also caused to change in accordance with the rotational speed Ne since. At this time, it is known that the higher the rotational speed Ne, the intake or suction performance increases and the delay time Td decreases.

Hereinafter, a description will be made by taking as an example a case where the processing according to the third embodiment of the present invention, in which the start timing θo of the valve overlap can be accurately detected so as to make it possible to correct the basic timing even in the case of a large intake pipe volume, is applied to the above-mentioned second embodiment.

As shown in FIG. 12, a detection error θε of the start timing θo of the valve overlap is caused due to the delay time Td from the time the variable valve timing mechanism 13 was started to operate until the time the intake negative pressure Pb has actually changed.

Accordingly, as in the third embodiment of the present invention, it is desirable to compensate for the delay time Td by successively storing the amount of correction KPb(Ne, θ) calculated from the basic amount of advance angle θ and the rotational speed Ne (detected value), also successively storing the basic amount of advance angle θ, and reading the value of the amount of correction KPb(Ne, θ) and the basic amount of advance angle θ thereby to correct the intake negative pressure Pb (detected value) after a predetermined time TDLY (corresponding to the delay time Td) has elapsed from their storage.

Next, reference will be made to a correction principle for the delay time Td according to this third embodiment of the present invention while referring to FIGS. 13 and 14.

Figure 13:
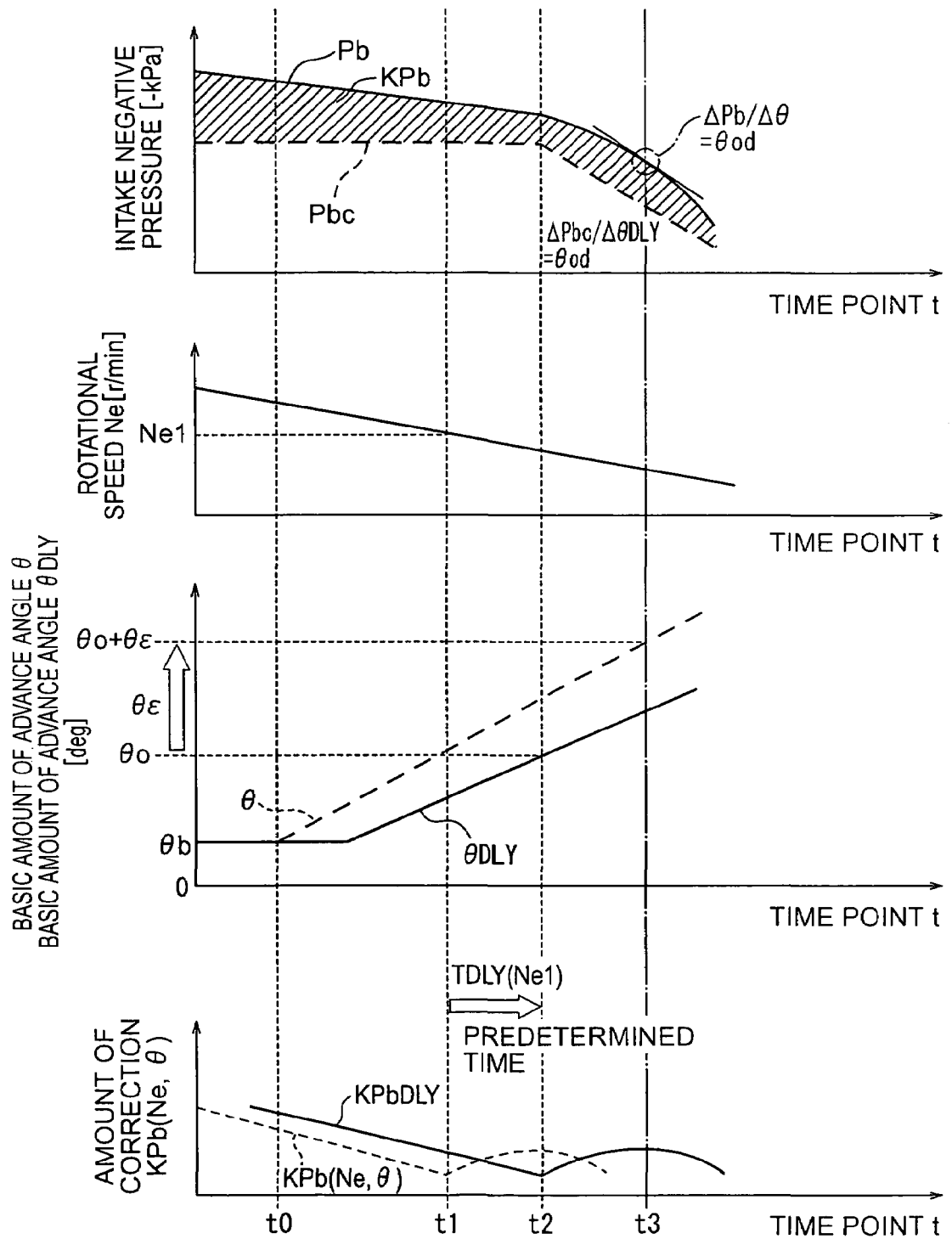
FIG. 13 is a timing chart illustrating a basic timing correcting operation according to the third embodiment of the present invention.

FIG. 13 is a timing chart that shows the correction operation for the basic timing θb of the variable valve timing mechanism 13 according to the third embodiment of the present invention, wherein the correction processing is carried out when the intake pipe volume is large and when the rotational speed Ne is decreasing.

Figure 14:
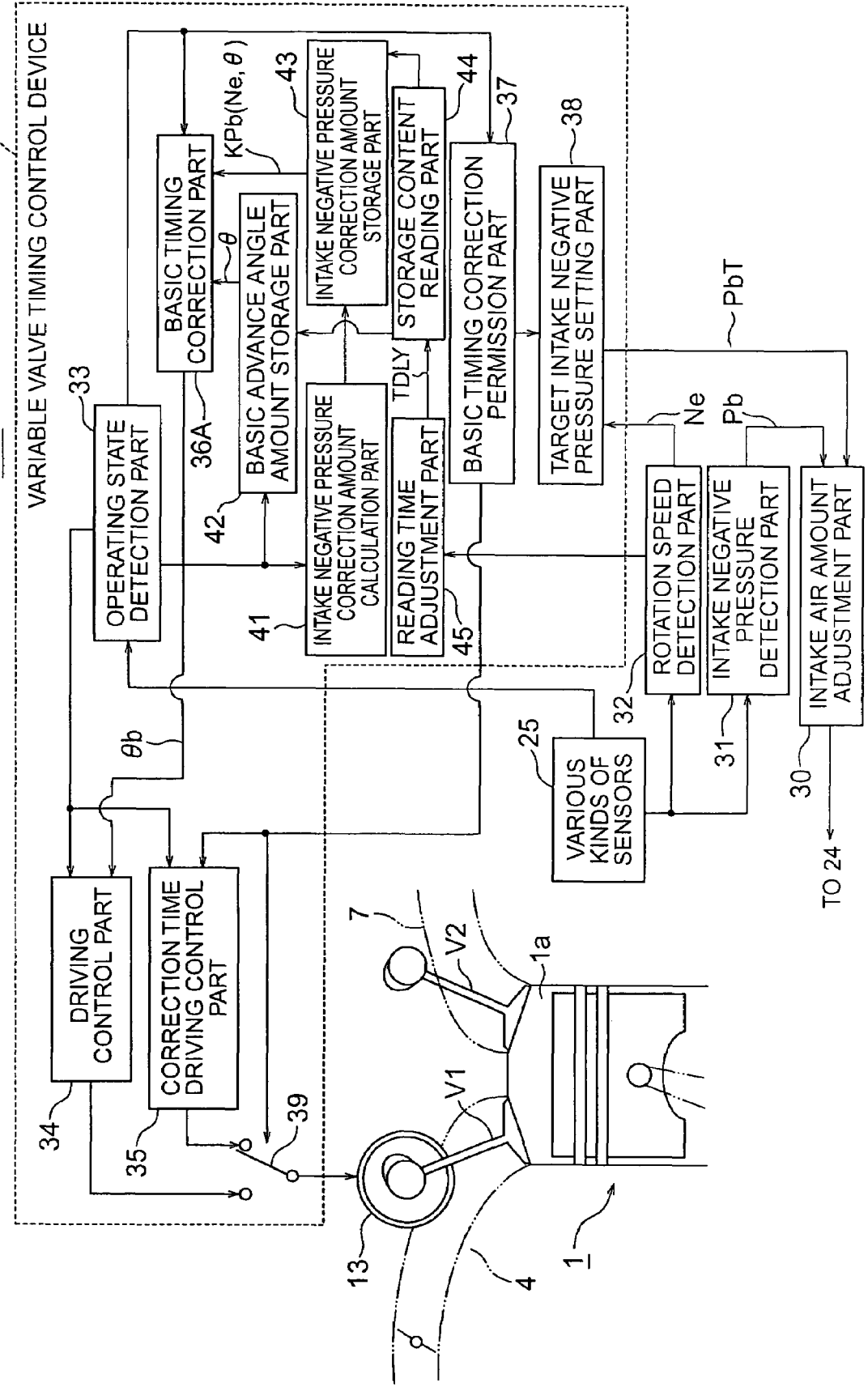
FIG. 14 is a block diagram illustrating the functional configuration of an ECU according to the third embodiment of the present invention.

FIG. 14 is a block diagram that shows the functional configuration of an ECU 17A according to the third embodiment of the present invention, wherein the same parts or components as those described above (see FIG. 1) are identified by the same symbols or by the same symbols with "A" affixed to their ends, while omitting a detailed explanation thereof.

In this case, an intake negative pressure correction amount calculation part 41 as described in the above-mentioned embodiments (e.g., see the second embodiment) is shown in the ECU 17A.

In addition, a variable valve timing control device 40A in the ECU 17A includes, in addition to the above-mentioned configuration, a basic advance angle amount storage part 42, an intake negative pressure correction amount storage part 43, a storage content reading part 44, and a reading time adjustment part 45.

The intake negative pressure correction amount calculation part 41 calculates the amount of correction KPb(Ne, θ) of the intake negative pressure Pb based on the operating state information (rotational speed Ne) and the basic amount of advance angle θ, as previously stated.

The basic advance angle amount storage part 42 stores the basic amount of advance angle θ representing the absolute amount of the phase difference of the variable valve timing mechanism 13, and the intake negative pressure correction amount storage part 43 stores the amount of correction KPb(Ne, θ) calculated by the intake negative pressure correction amount calculation part 41.

The storage content reading part 44 reads out the storage contents of the intake negative pressure correction amount storage part 43 and the basic advance angle amount storage part 42.

Further, the storage content reading part 44 reads out the basic amount of advance angle θ stored in the basic advance angle amount storage part 42 and the amount of correction KPb(Ne, θ) stored in the intake negative pressure correction amount storage part 43 after the predetermined time TDLY has elapsed from time points at which the basic amount of advance angle θ and the amount of correction KPb(Ne, θ) were stored, respectively.

The reading time adjustment part 45 determines the predetermined time TDLY for delaying the reading timing of the storage content reading part 44, based on the rotational speed Ne detected by the rotation speed detection part 32.

That is, the basic amount of advance angle θ is stored in the basic advance angle amount storage part 42, and the corrected intake negative pressure Pbc calculated from the basic amount of advance angle θ and the rotational speed Ne are stored in the intake negative pressure correction amount storage part 43, so that these pieces of data θ, Pbc are respectively read out by the storage content reading part 44 after the predetermined time TDLY, and input to the basic timing correction part 36A.

Here, it is assumed that the true value of the start timing of the valve overlap to be detected is "θo".

In addition, the predetermined time TDLY is a function value (i.e., a value experimentally provided beforehand) set in accordance with the rotational speed Ne of the internal combustion engine 1.

In FIG. 13, the correction processing for the basic timing θb of the variable valve timing mechanism 13 begins to be executed from time point t0, and the value of the basic amount of advance angle θ begins to increase from time point t0.

The basic amount of advance angle θ is stored in the basic advance angle amount storage part 42 at the same time as it's being detected.

Similarly, the amount of correction KPb(Ne, θ) of the intake negative pressure Pb is stored in the intake negative pressure correction amount storage part 43 after having been calculated based on the rotational speed Ne of the internal combustion engine 1 and the basic amount of advance angle θ.

For instance, at time point t1, the start timing θo of the valve overlap obtained as a basic amount of advance angle is stored in the basic advance angle amount storage part 42 as a basic amount of advance angle at time point t1.

Also, at time point t1, the amount of correction KPb(Ne1, θo) of the intake negative pressure Pb at time point t1 is calculated based on the rotational speed Ne1 of the internal combustion engine 1 and the start timing θo of the valve overlap (basic amount of advance angle), and it is stored in the intake negative pressure correction amount storage part 43.

The values stored in the respective storage parts 42, 43 are read out from the respective storage parts 42, 43 and applied to the detected intake negative pressure Pb after a predetermined time TDLY(Ne1), which is set in accordance with the rotational speed Ne1 detected at time point t1, has elapsed.

That is, at time point t2 elapsed the predetermined time TDLY(Ne1) from time point t1, the amount of correction KPb(Ne1, θo) stored at time point t1 is read out from the amount of correction of negative pressure storing 43 as an amount of correction KPbDLY(t2).

Then, the intake negative pressure Pb detected at time point t2 is corrected to provide a corrected intake negative pressure Pbc(t2) by using the amount of correction KPbDLY(t2), as shown in the following expression (7).

$$Pbc(t2)=Pb(t2)-KPbDLY(t2) \quad (7)$$

At time point t2, the basic amount of advance angle (the start timing θo of the valve overlap) stored at time point t1 is read out from the basic advance angle amount storage part 42 as the basic amount of advance angle θDLY(t2).

Hereinafter, an amount of change of the intake negative pressure with respect to the basic amount of advance angle θ (=ΔPbc/ΔθDLY) is calculated by using the basic amount of advance angle θDLY read out from the basic advance angle amount storage part 42 and the corrected intake negative pressure Pbc obtained from the expression (7), as in the case of the above-mentioned expression (5).

At this time, as is clear from FIG. 13, the basic amount of advance angle θDLY at time point t2 at which the value of the amount of change of the intake negative pressure change (=ΔPbc/ΔθDLY) begins to coincide with the above-mentioned value θod (see the second embodiment) becomes the start timing θo of the valve overlap.

Accordingly, the start timing of the valve overlap can be accurately detected as the true value θo, so a desired basic timing θb(=θo−θi) can be obtained from the above-mentioned expression (3) based on the accurate detected value θo and the predetermined timing θi.

If the amount of intake negative pressure change ΔPb/Δθ with respect to the basic amount of advance angle θ is calculated from the above-mentioned expression (5) by using the intake negative pressure Pb and the basic amount of advance angle θ without taking account of the delay time Td (i.e., without using the respective storage parts 42, 43), the amount of intake negative pressure change ΔPb/Δθ will coincide with the value "θod" at time point t3, as shown by an alternate long and two short dashes line range in FIG. 13.

In this case, there will be a detection error θε in the basic amount of advance angle θ at time point t3 with respect to the true value θo, thus generating an error in the calculation result of the basic timing θb.

Accordingly, in order to detect the accurate basic timing θb, it is effective to compensate for the delay time Td by using the respective storage parts 42, 43, as in the third embodiment of the present invention.

Now, reference will be made to an operation for correcting the basic timing θb according to the third embodiment of the present invention while referring to a flow charts of FIGS. 15 through 17 and an explanatory view of FIG. 18.

Figure 15:
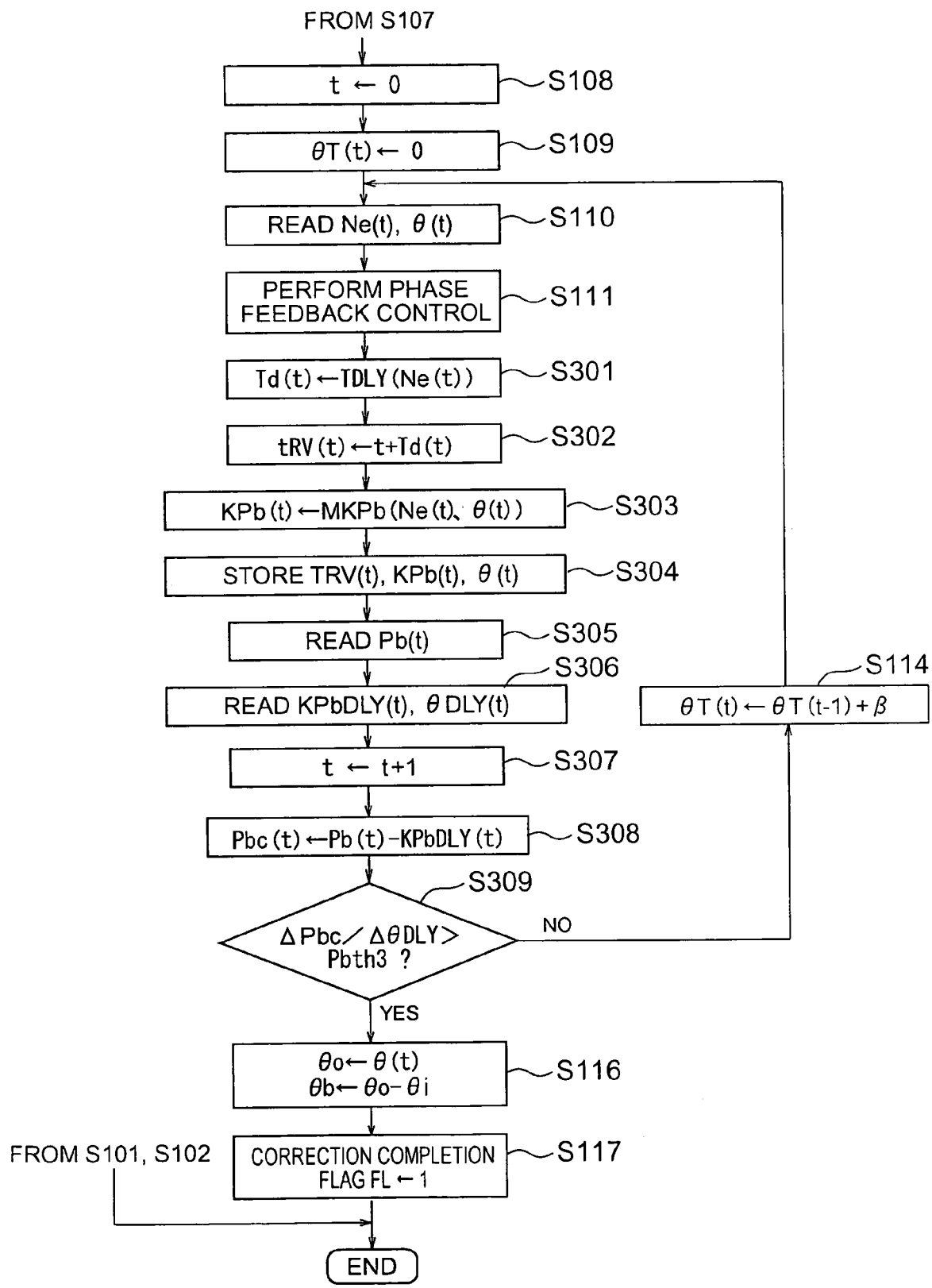
FIG. 15 is a flow chart illustrating a basic timing correcting operation (main routine) according to the third embodiment of the present invention.

FIG. 15 shows only the processing from the above-mentioned step S108 onward (see FIG. 6), while unillustrated steps S101 through S107 are similar to the above-mentioned ones. In addition, the same or like processing steps as those described above are identified by the same symbols while omitting a detailed description thereof.

Figure 16:
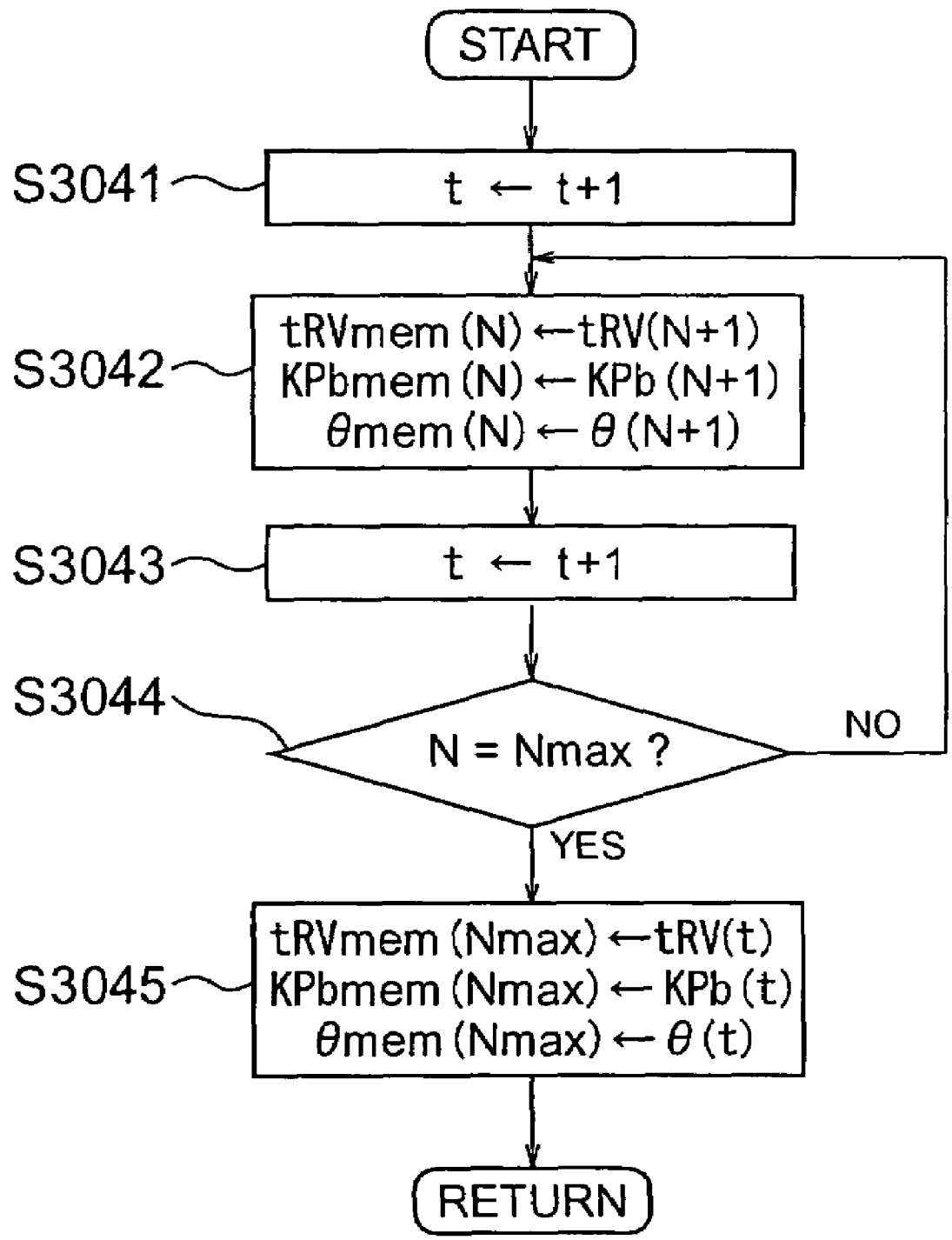
FIG. 16 is a flow chart illustrating a specific processing content of a storage subroutine in FIG. 15.
Figures 17, 18:
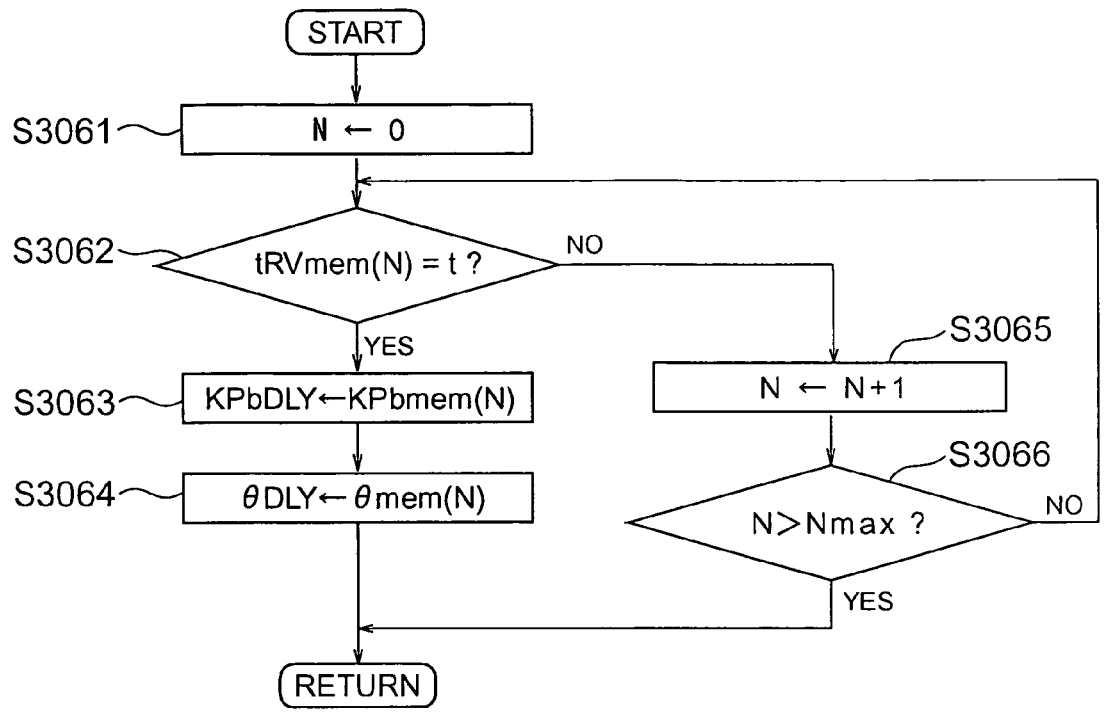
FIG. 17 is a flow chart illustrating a specific processing content of a read subroutine in FIG. 15.
FIG. 18 is an explanatory view showing storage areas in the ECU in a table form according to the third embodiment of the present invention.

Here, note that steps S304 and S306 in FIG. 15 (main routine) are called as a subroutine of FIG. 16 and a subroutine of a FIG. 17, respectively, so as to be executed.

FIG. 18 shows storage areas in the ECU 17A in a table form, which are applied to the respective storage parts 42, 43 and the storage content reading part 44.

In FIG. 18, the individual values of the read-out time point tRV(t), the amount of correction KPb(t) of the intake negative pressure, and the basic amount of advance angle θ(t) are stored in storage areas tRVmem(N), KPbmem(N), and θmem(N), respectively, for each arrangement number N (=0, 1, 2, . . . , Nmax) in an arranged form.

In FIG. 15, following the phase feedback control of the variable valve timing mechanism 13 (step S111, the reading time adjustment part 45 in the ECU 17A calculates a predetermined time TDLY(Ne(t)) by using a rotational speed Ne(t) read out at time point t, and sets it as a variable Td(t) corresponding to the delay time (step S301).

Subsequently, the reading time adjustment part 45 sets, as a read-out time point tRV(t), a value (=t+Td(t)), which is obtained by adding the delay time Td(t) set in step S301 to the current time t (step S302).

Then, the intake negative pressure correction amount calculation part 41 calculates the amount of correction KPb(t) of the intake negative pressure Pb according to the following expression (8) by using the rotational speed Ne(t) and the basic amount of advance angle θ(t) read out at time point t (step S303).

$$KPb(t)=MKPb(Ne(t), \theta(t)) \quad (8)$$

Here, note that in expression (8) above, MKPb(Ne(t), θ(t)) represents a map data value, which is given, for example, by the above-mentioned map data shown in FIG. 8.

Thereafter, the storage content reading part 44, the intake negative pressure correction amount storage part 43, and the basic advance angle amount storage part 42 in the ECU 17A execute a storage subroutine (step S304).

That is, the read-out time point tRV(t), the amount of correction KPb(t) of the intake negative pressure Pb, and the basic amount of advance angle θ(t) are stored or saved in the storage areas (memory) of the ECU 17A.

Here, reference will be made to the specific content of processing of the storage subroutine (step S304) executed by the ECU 17A while referring to FIG. 16 and FIG. 18.

FIG. 16 shows the content of processing in which the read-out time point tRV(t), the amount of correction KPb(t)

of the intake negative pressure Pb, and the basic amount of advance angle θ(t) are stored or saved in the storage areas of the ECU 17A.

In FIG. 16, first of all, a counter value N used in the storage subroutine is reset to "0" (step S3041), and the individual values stored in the arranged form of FIG. 18 are stored or saved in the storage areas, respectively, indicated by the one-preceding arrangement numbers (step S3042).

In other words, the values of arrangement number N=1 are stored in the areas of arrangement number N=0 at an initial stage.

As the storage areas of the ECU 17A, there are set a storage area tRVmem(N) for the read-out time point tRV(t), a storage area KPbmem(N) for the amount of correction KPb(t) of the intake negative pressure Pb, and a storage area θmem(N) for the basic amount of advance angle θ(t) with respect to each of arrangement numbers 0 through Nmax, as shown in FIG. 18.

Then, the counter value N is incremented (step S3043), and it is determined whether the counter value N coincides with a maximum value Nmax of the arrangement numbers (step S3044).

When it is determined as N<Nmax in step S3044 (that is, NO), a return to step S3042 is performed.

On the other hand, when it is determined as N=Nmax in step S3044 (that is, YES), it is assumed that the individual values of the arrangement numbers 1 through Nmax have been copied as the values of the one-preceding arrangement numbers 0 through Nmax-1, and the control flow advances to step S3045.

In step S3045, the read-out time point tRV(t), the amount of correction KPb(t), and the basic amount of advance angle θ(t), which were calculated or detected in the main routine, are stored in the storage areas for the maximum value Nmax of the arrangement numbers, and a return to the main routine is carried out (FIG. 15).

By executing a series of processes (steps S304 through S304) of the storage subroutine (FIG. 16), the latest individual values tRV(t), KPb(t), θ(t) are stored in the storage areas of arrangement number Nmax (maximum value) in FIG. 18 each time the parameter t is incremented by 1 in the main routine (FIG. 15), and the values stored until the last time are stored or saved in the storage areas, respectively, for the arrangement numbers one preceding from the original arrangement numbers.

At this time, as is clear from FIG. 16 and FIG. 18, the individual values for arrangement number 0, i.e., the individual values calculated (or detected) in the main routine (see FIG. 15) at a time point of the unit of "Nmax+1" before time point t are deleted from the storage areas (see FIG. 18) in the ECU 17A.

Returning to FIG. 15 (main routine), following the storage subroutine (step S304), the ECU 17A reads out the current intake negative pressure Pb(t) (step S305), and the storage content reading part 44 executes a read subroutine by applying the read-out time point tRV(t) (step S306).

That is, after the predetermined time TDLY(Ne(t)) (=the delay time Td(t)) has elapsed, the amount of correction KPbDLY(t) of the intake negative pressure Pb and the basic amount of advance angle θDLY(t) are read from the intake negative pressure correction amount storage part 43 and the basic advance angle amount storage part 42, respectively.

Here, reference will be made to the specific content of processing of the read subroutine (step S306) executed by the ECU 17A while referring to FIG. 17.

FIG. 17 shows the content of processing for reading the amount of correction KPbDLY(t) of the intake negative pressure and the basic amount of advance angle θDLY(t) from the intake negative pressure correction amount storage part 43 and the basic advance angle amount storage part 42, respectively.

In FIG. 17, first of all, a counter value N used in the read subroutine is reset to "0" (step S3061), and it is determined whether the arrangement tRVmem(N) of the read-out time point stored in the storage subroutine (step S304) coincides with the current time t (step S3062).

When it is determined as tRVmem(N)=t in step S3062 (that is, YES), it is assumed that values to be read out are stored in the storage areas (FIG. 18), and a value KPbmem (N) read out from the storage areas is set as the amount of correction KPbDLY of the intake negative pressure Pb (step S3063).

Also, a value θmem(N) read out from the storage areas is set as the basic amount of advance angle θDLY (step S3064), and the read subroutine of FIG. 17 is exited, returning to the main routine of FIG. 15.

On the other hand, when it is determined as tRVmem(N)≠ t in step S3062 (that is, NO), the counter value N is incremented (step S3065), and it is determined whether the counter value N is larger than the maximum value Nmax of the arrangement numbers (step S3066).

When it is determined as N>Nmax in step S3066 (that is, YES), it is assumed that there exists no value to be read out from the storage areas at the current time t, and the read subroutine of FIG. 17 is terminated.

On the other hand, when it is determined as N≦Nmax in step S3066 (that is, NO), a return is performed to step S3062 where it is determined whether the arrangement tRVmem(N) of the read-out time point stored in the storage subroutine (step S304) coincides with the current time t (step S3062), and it is further investigated whether there are values to be read out in the storage areas (FIG. 18) at the current time t.

Thus, according to the series of processes of the read subroutine (FIG. 17), it is possible to search for and read out the amount of correction KPbDLY of the intake negative pressure Pb and the basic amount of advance angle θDLY to be called at the current time point t based on the read-out time point tRVmem in the storage areas.

Here, note that when any read-out time point tRVmem that coincides with the current time point t does not exist in the storage areas, i.e., when there has been found no value to be read out, neither of the individual values KPbDLY and θDLY is updated in the read subroutine (FIG. 17), so the values read out last time are used in the main routine (FIG. 15).

A return is performed to the main routine of FIG. 15, where following the read subroutine (see step S306 and FIG. 17), the time point parameter t is incremented, similar to the above-mentioned step S112 (see FIGS. 6 and 11) (step S307).

Subsequently, the current intake negative pressure Pb(t) is corrected by using the amount of correction KPbDLY(t) read out in step S306, and the corrected intake negative pressure Pbc(t) is calculated, as shown in the following expression (9), similar to the above-mentioned expressions (4), (6) and (7) (step S308).

$$Pbc(t)=Pb(t)-KPbDLY(t) \tag{9}$$

Then, a difference between the current corrected intake negative pressure Pbc(t) at the current time point "t" and the last corrected intake negative pressure Pbc(t−1) at the one preceding (last) processing time point (t−1) is calculated as a corrected negative pressure change ΔPbc, and a difference between the current basic amount of advance angle θDLY(t)

at the current time "t" and the last basic amount of advance angle θDLY (t−1) at the last time point "t−1" is calculated as an advance angle amount change ΔθDLY. Thereafter, it is determined whether a value (=ΔPbc/ΔθDLY) obtained by dividing the corrected negative pressure change ΔPbc by the advance angle amount change ΔθDLY exceeds a threshold Pbth3 (predetermined value) for determination of a change in the intake negative pressure Pb (step S202).

Here, note that the threshold Pbth3, which becomes a determination reference for the intake negative pressure change index (=ΔPbc/ΔθDLY), is set to a value that is slightly smaller than the amount of intake negative pressure change θod so as to determine a change corresponding to the amount of intake negative pressure change θod. The threshold Pbth3 may be the same value as the threshold Pbth2.

On the other hand, when it is determined as ΔPbc/ΔθDLY≦Pbth3 in step S309 (that is, NO), the control flow proceeds to the above-mentioned step S114 where the basic amount of advance angle θ is further advanced, and a return to step S110 is carried out.

On the other hand, when it is determined as ΔPbc/ΔθDLY>θod in step S309 (that is, YES), the basic timing θb is corrected as previously stated (step S116), and the correction completion flag FL is set to "1" (step S117), and the main routine of FIG. 15 is terminated.

As described above, according to the ECU 17A (the variable valve timing control device 40A) of the third embodiment of the present invention, the corrected intake negative pressure Pbc calculated from the basic amount of advance angle θ and the rotational speed Ne and the basic amount of advance angle θ are successively stored, so that the individual values are read out to correct the detected value Pb of the intake negative pressure Pb after the predetermined time TDLY (corresponding to the delay time Td) has elapsed. As a result, it is possible to compensate for the delay time Td of the amount of intake negative pressure change θod with respect to the change of the basic amount of advance angle θ, whereby the start timing θo of the valve overlap can be detected in an accurate manner.

Accordingly, even when the volume of the intake pipe 4 is large, the basic timing θb of the variable valve timing mechanism 13 can be corrected with a high degree of precision.

In addition, by determining the predetermined period TDLY in accordance with the rotational speed Ne, e.g., by adjusting the predetermined period TDLY in such a manner that the predetermined period TDLY shortens in accordance with of the rising rotational speed Ne, it is possible to set the predetermined period TDLY to an appropriate value corresponding to the delay time Td, so the basic timing θb of the variable valve timing mechanism 13 can be corrected with a high, degree of precision.

While the invention has been described in terms of preferred embodiments, those skilled in the art will recognize that the invention can be practiced with modifications within the spirit and scope of the appended claims.

What is claimed is:

1. A control apparatus for an internal combustion engine comprising:
    an intake valve that is driven in synchronization with the rotation of an internal combustion engine at timing with a predetermined phase difference thereby to open and close an intake pipe leading to a combustion chamber of said internal combustion engine;
    a variable valve timing mechanism that continuously adjusts the opening and closing timing of said intake valve to an advance angle side and a retard angle side with reference to a predetermined basic timing;
    a variable valve timing control device that includes an operating state detection part for detecting an operating state of said internal combustion engine, and serves to drive and control said variable valve timing mechanism based on said engine operating state;
    a rotational speed detection part that detects a rotational speed of said internal combustion engine; and
    an intake negative pressure detection part that detects an intake negative pressure in said intake pipe varying in accordance with an adjustment of the opening and closing timing of said intake valve;
    wherein said variable valve timing control device comprises:
    a basic timing correction permission part that permits a correction operation for said basic timing when said operating state of said internal combustion engine is in a fuel cut-off state;
    a target intake negative pressure setting part that determines, based on said rotational speed of said internal combustion engine, a target intake negative pressure that should be set as an initial state of said correction operation for said basic timing when said correction operation for said basic timing is permitted;
    an intake air amount adjustment part that adjusts an amount of intake air sucked into said combustion chamber so as to make said intake negative pressure detected by said intake negative pressure detection part coincide with said target intake negative pressure;
    a correction time driving control part that controls said variable valve timing mechanism so as to be driven to advance after said intake negative pressure is made to coincide with said target intake negative pressure by means of said intake air amount adjustment part; and
    a basic timing correction part that corrects said basic timing based on the state of said variable valve timing mechanism when an intake negative pressure change index calculated by using said intake negative pressure exceeds a predetermined value during the driving and controlling operation of said correction time driving control part.

2. The control apparatus for an internal combustion engine as set forth in claim 1, wherein
    said variable valve timing control device further comprises an intake negative pressure correction amount calculation part that serves to correct said intake negative pressure used to calculate said intake negative pressure change index; and
    said intake negative pressure correction amount calculation part calculates an amount of correction of negative pressure to correct said intake negative pressure by using said rotational speed detected by said rotation speed detection part and an amount of displacement of said variable valve timing mechanism.

3. The control apparatus for an internal combustion engine as set forth in claim 2, wherein
    said variable valve timing control device further comprises:
    a basic advance angle amount storage part that stores a basic amount of advance angle representing an absolute amount of a phase difference of said variable valve timing mechanism;

an intake negative pressure correction amount storage part that stores said amount of correction of negative pressure) calculated by said intake negative pressure correction amount calculation part; and a storage content reading part that reads out storage contents of said basic advance angle amount storage part and said intake negative pressure correction amount storage part;

wherein said storage content reading part reads out said basic amount of advance angle stored in said basic advance angle amount storage part and said amount of correction stored in said intake negative pressure correction amount storage part after a predetermined time has elapsed from time points at which said basic amount of advance angle and said amount of correction were stored, respectively.

4. The control apparatus for an internal combustion engine as set forth in claim 3, wherein said variable valve timing control device further comprises a reading time adjustment part; and said reading time adjustment part determines said predetermined time based on said rotational speed detected by said rotation speed detection part.

* * * * *